United States Patent
Furuki et al.

(10) Patent No.: US 10,417,743 B2
(45) Date of Patent: Sep. 17, 2019

(54) IMAGE PROCESSING DEVICE, IMAGE PROCESSING METHOD AND COMPUTER READABLE MEDIUM

(71) Applicant: MITSUBISHI ELECTRIC CORPORATION, Tokyo (JP)

(72) Inventors: Ichiro Furuki, Tokyo (JP); Tsukasa Fukasawa, Tokyo (JP); Kohei Okahara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 39 days.

(21) Appl. No.: 15/756,455

(22) PCT Filed: Nov. 6, 2015

(86) PCT No.: PCT/JP2015/081358
§ 371 (c)(1),
(2) Date: Feb. 28, 2018

(87) PCT Pub. No.: WO2017/077650
PCT Pub. Date: May 11, 2017

(65) Prior Publication Data
US 2018/0253823 A1    Sep. 6, 2018

(51) Int. Cl.
*G06K 9/40* (2006.01)
*G06T 3/40* (2006.01)
(Continued)

(52) U.S. Cl.
CPC .............. *G06T 3/4038* (2013.01); *B60R 1/00* (2013.01); *G06K 9/0063* (2013.01); *G06T 7/174* (2017.01);
(Continued)

(58) Field of Classification Search
CPC ...... B60R 1/00; B60R 2300/105; H04N 7/18; G06T 19/006; G06T 3/4038;
(Continued)

(56) References Cited

U.S. PATENT DOCUMENTS 8,295,644 B2 * 10/2012 Shulman ............ G01C 21/3647
382/298
8,456,327 B2 * 6/2013 Bechtel ..................... B60R 1/04
340/435
(Continued)

FOREIGN PATENT DOCUMENTS

JP    2007-27948 A    2/2007
JP    2007-109113 A    4/2007
(Continued)

OTHER PUBLICATIONS

International Search Report for PCT/JP2015/081358 (PCT/ISA/210) dated Jan. 19, 2016.

*Primary Examiner* — Charlotte M Baker
(74) *Attorney, Agent, or Firm* — Birch, Stewart, Kolasch & Birch, LLP

(57) ABSTRACT

The present invention is provided with a boundary calculation unit (110) to calculate a boundary position (180) being a basis for dividing a common area into a side of the first imaging device (210) and a side of the second imaging device (220), a selection unit (130) to select a bird's-eye view image wherein distortion in an image of a three-dimensional object is less as a selected image (330), out of the first bird's-eye view image (311) and the second bird's-eye view image (321) based on the boundary position (180) and a position of the three-dimensional object, and an image generation unit (140) to generate an area image (340) based on an image other than the common area in the first bird's-eye view image (311), an image other than the com-
(Continued)

mon area in the second bird's-eye view image (321), and an image of the common area included in the selected image (330).

9 Claims, 16 Drawing Sheets

(51) Int. Cl.
*B60R 1/00* (2006.01)
*H04N 7/18* (2006.01)
*G06T 7/174* (2017.01)
*G06T 7/70* (2017.01)
*G06K 9/00* (2006.01)
*H04N 5/357* (2011.01)
*G06K 9/20* (2006.01)

(52) U.S. Cl.
CPC ............ *G06T 7/70* (2017.01); *H04N 5/3572* (2013.01); *H04N 7/181* (2013.01); *B60R 2300/303* (2013.01); *B60R 2300/607* (2013.01); *G06K 2009/2045* (2013.01)

(58) Field of Classification Search
CPC .. G06T 15/205; G06K 9/00805; G08G 1/166; G08G 1/167
USPC ........................................................ 382/275
See application file for complete search history.

(56) References Cited

U.S. PATENT DOCUMENTS

| | | | |
|---|---|---|---|
| 8,514,282 B2* | 8/2013 | Imanishi | B60R 1/00 348/143 |
| 9,050,931 B2* | 6/2015 | Yamamoto | G06K 9/00791 |
| 9,715,631 B2* | 7/2017 | Takahashi | B60R 1/00 |
| 2007/0085901 A1 | 4/2007 | Yang et al. | |
| 2008/0043113 A1 | 2/2008 | Ishii | |
| 2009/0121851 A1 | 5/2009 | Abe | |
| 2010/0134593 A1 | 6/2010 | Kakinami | |
| 2011/0001826 A1* | 1/2011 | Hongo | B60R 1/00 348/148 |
| 2012/0219190 A1 | 8/2012 | Kumagai | |

FOREIGN PATENT DOCUMENTS

| | | |
|---|---|---|
| JP | 2008-48345 A | 2/2008 |
| JP | 2009-118416 A | 5/2009 |
| JP | 2009-153156 A | 7/2009 |
| JP | 2009-236569 A | 10/2009 |
| JP | 2010-128939 A | 6/2010 |
| JP | 2010-147523 A | 7/2010 |
| JP | 4934308 B2 | 5/2012 |
| JP | 2012-174152 A | 9/2012 |
| JP | 5053043 B2 | 10/2012 |
| JP | 2013-115738 A | 6/2013 |
| WO | WO 2010/070920 A1 | 6/2010 |

* cited by examiner

IMAGE PROCESSING DEVICE, IMAGE PROCESSING METHOD AND COMPUTER READABLE MEDIUM

TECHNICAL FIELD

The present invention relates to an image processing device, an image processing method and an image processing program to synthesize a plurality of bird's-eye view images obtained by switching viewpoints.

BACKGROUND ART

Conventionally, there has been techniques to generate bird's-eye view images in an overlooking manner, respectively obtained by switching viewpoints of a plurality of camera images, and generate a synthesis bird's-eye view image by synthesizing the plurality of bird's-eye view images generated. In a bird's-eye view image generated by switching viewpoints, all the photographic objects in the image are displayed to exist in the same plane. Further, generally, since a bird's-eye view image is generated on the basis of the ground level, an object existing at a position above the ground is displayed to be distorted in an extended state as if the object fell down to the ground. Furthermore, when a synthesis bird's-eye view image is generated, generally, cameras are installed so that imaging ranges of adjacent camera images partially overlap with each other. An image of an object placed in an overlapping imaging range may disappear, or may be doubly seen due to influence of camera parallax.

Patent Literature 1 discloses a technique to preferentially display, as an image of an overlapping part, a bird's-eye view image wherein an image of a three-dimensional object appears to be larger out of two bird's-eye view images generated from two camera images whose imaging ranges partially overlap.

CITATION LIST

Patent Literature

Patent Literature 1: JP5053043 B2

SUMMARY OF INVENTION

Technical Problem

By the technique in Patent Literature 1, since one of two bird's-eye view images is displayed, there is no possibility that an object disappears or is doubly seen; however, since a bird's-eye view image wherein an image of a three-dimensional object appears to be larger is adopted, there is a problem that an image wherein distortion of a three-dimensional object is large may be displayed.

The present invention is aimed at obtaining an image wherein distortion of a three-dimensional object is little, as an image of an overlapping part between two bird's-eye view images generated from two camera images.

Solution to Problem

An image processing device according to one aspect of the present invention includes:

a boundary calculation unit to calculate, by using first device information including position information of a first imaging device to take an image of a first area including a common area wherein a three-dimensional object is placed, and second device information including position information of a second imaging device to take an image of a second area including the common area, a boundary position being a basis for dividing the common area into a side of the first imaging device and a side of the second imaging device;

a selection unit to select, based on the boundary position and a position of the three-dimensional object, a bird's-eye view image wherein distortion in an image of the three-dimensional object is less as a selected image, out of a first bird's-eye view image, which is an image of the first area being switched a viewpoint after having been taken by the first imaging device, wherein an image of the three-dimensional object is distorted, and of a second bird's-eye view image, which is an image of the second area being switched a viewpoint after having been taken by the second imaging device, wherein an image of the three-dimensional object is distorted; and an image generation unit to generate, based on an image of the first area other than the common area in the first bird's-eye view image, an image of the second area other than the common area in the second bird's-eye view image, and an image of the common area included in the selected image, an area image of an area composed of the first area and the second area.

Advantageous Effects of Invention

Since an image processing device according to the present invention includes a boundary calculation unit to calculate a boundary position being a basis for dividing a common area into a side of the first imaging device and a side of the second imaging device, and a selection unit to select a bird's-eye view image wherein distortion of an image of a three-dimensional object is less as a selected image, out of the first bird's-eye view image and the second bird's-eye view image wherein images of the three-dimensional object are distorted, based on the boundary position and a position of the three-dimensional object, there is an effect that an image wherein distortion of the three-dimensional object is little can be obtained as a bird's-eye view image of the common area.

DESCRIPTION OF EMBODIMENTS

First Embodiment

Explanation of Configuration

Figure 1:
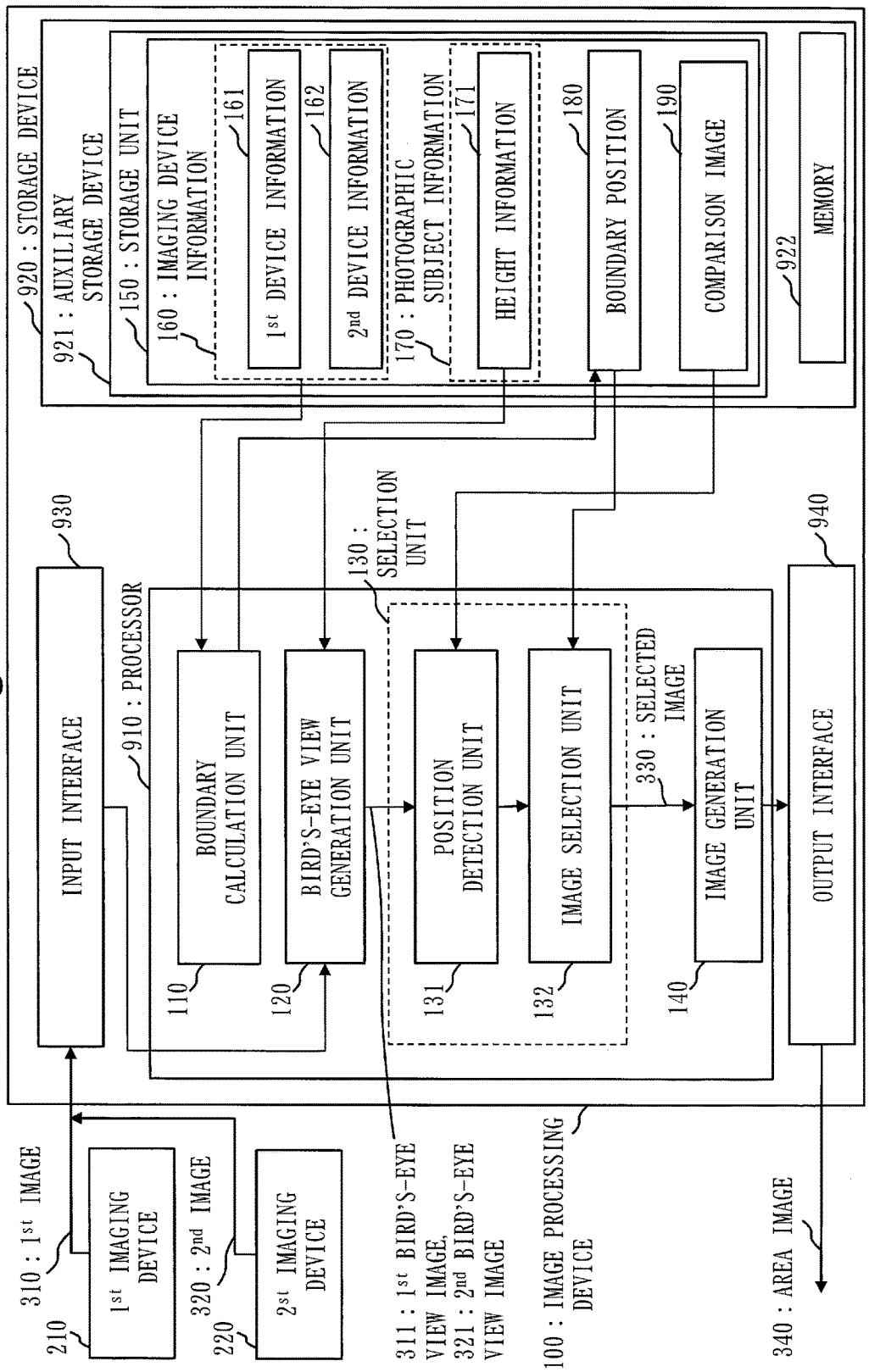
FIG. 1 is a diagram illustrating a configuration of an image processing device 100 according to a first embodiment.

A configuration of an image processing device 100 according to a first embodiment will be discussed using FIG. 1.

In the present embodiment, the image processing device 100 is a computer. The image processing device 100 is equipped with hardware components, such as a processor 910, a storage device 920, an input interface 930, an output interface 940, etc.

Further, the image processing device 100 is equipped with a boundary calculation unit 110, a bird's-eye view generation unit 120, a selection unit 130, an image generation unit 140 and a storage unit 150, as the function configuration. The selection unit 130 includes a position detection unit 131 and an image selection unit 132. In the following explanation, functions of the boundary calculation unit 110, the bird's-eye view generation unit 120, the position detection unit 131, the image selection unit 132 and the image generation unit 140 in the image processing device 100 are referred to as functions of "units" in the image processing device 100. The functions of the "units" in the image processing device 100 are realized by software.

Further, the storage unit 150 is realized by the storage device 920. The storage unit 150 stores imaging device information 160, photographic subject information 170, a boundary position 180 and a comparison image 190. The imaging device information 160 includes first device information 161 and second device information 162. Further, the photographic subject information 170 includes height information 171.

The processor 910 is connected to other hardware components via a signal line to control the other hardware components.

The processor 910 is an integrated circuit (IC) that performs processing. The processor 910 is, specifically, a central processing unit (CPU).

The storage device 920 includes an auxiliary storage device 921 and a memory 922. The auxiliary storage device 921 is, specifically, a read only memory (ROM), a flash memory, or a hard disk drive (HDD). The memory 922 is, specifically, a random access memory (RAM). The storage unit 150 is realized by the auxiliary storage device 921. The storage unit 150 may be realized by the auxiliary storage device 921 and the memory 922.

The input interface 930 is a port that is connected to a first imaging device 210 and a second imaging device 220. The input interface 930 is an image input interface by which a first image 310 taken by the first imaging device 210 and a second image 320 taken by the second imaging device 220 are imported into the image processing device 100. The first image 310 and the second image 320 imported by the input interface 930 are stored in the memory 922. Further, the input interface 930 may be a port that is connected to input devices such as a mouse, a keyboard, a touch panel, etc. The input interface 930 is, specifically, a universal serial bus (USB) terminal. The input interface 930 may be a port that is connected to a local area network (LAN). Otherwise, the input interface 930 may also be a capture board such as a serial digital interface (SDI), a high definition multimedia interface (HDMI®), a video graphics array (VGA), a digital video interface (DVI), a component, etc., whereby video signals can be imported into the image processing device 100.

The output interface 940 is a port whereto a cable of display equipment, such as a display, is connected. The output interface 940 is, for example, a USB terminal or a high definition multimedia interface (HDMI®) terminal. The display is, specifically, a liquid crystal display (LCD).

The auxiliary storage device 921 stores a program to realize the functions of the "units." The program is loaded into the memory 922, read into the processor 910, and executed by the processor 910. An operating system (OS) is also stored in the auxiliary storage device 921. At least a part of the OS is loaded into the memory 922, and the processor 910 executes the program to realize the functions of the "units" while executing the OS.

The image processing device 100 may be equipped with only one processor 910, or a plurality of processors 910. The plurality of processors 910 may execute the program to realize the functions of the "units" cooperatively.

The information, data, signal values and variable values indicating results of the processing by the functions of the "units" are stored in the auxiliary storage device 921, the memory 922, or a register or a cache memory in the processor 910. Now that in FIG. 1, arrows connecting each unit and the storage unit 150 describe that each unit stores results of processing into the storage unit 150, or each unit retrieves information from the storage unit 150. Further, arrows connecting each unit describe flows of control. Furthermore, arrows between the memory 922 and each unit describing that information of the first bird's-eye view image 311, the second bird's-eye view image 321 or a selected image 330 is sent and received between each unit via the memory 922 are omitted.

The program to realize the functions of the "units" may be stored in a portable storage medium such as a magnetic disk, a flexible disk, an optical disc, a compact disk, a blue-ray® disc, a digital versatile disc (DVD), etc.

The program to realize the functions of the "units" is also referred to as an image processing program. The image processing program is a program to realize the functions described as the "units." Further, what is referred to as an image processing program product is a storage medium or a storage device recording the image processing program, into which a program readable by a computer is loaded, irrespective of the form as it appears.

Explanation of Operation

The operation of the image processing device 100 according to the present embodiment will be discussed.

First, positional relation between the first imaging device 210 and the second imaging device 220 will be discussed, using FIG. 2. In the following explanation, there is a case wherein both or one of the first imaging device 210 and the second imaging device 220 are or is simply referred to as an imaging device.

Figure 2:
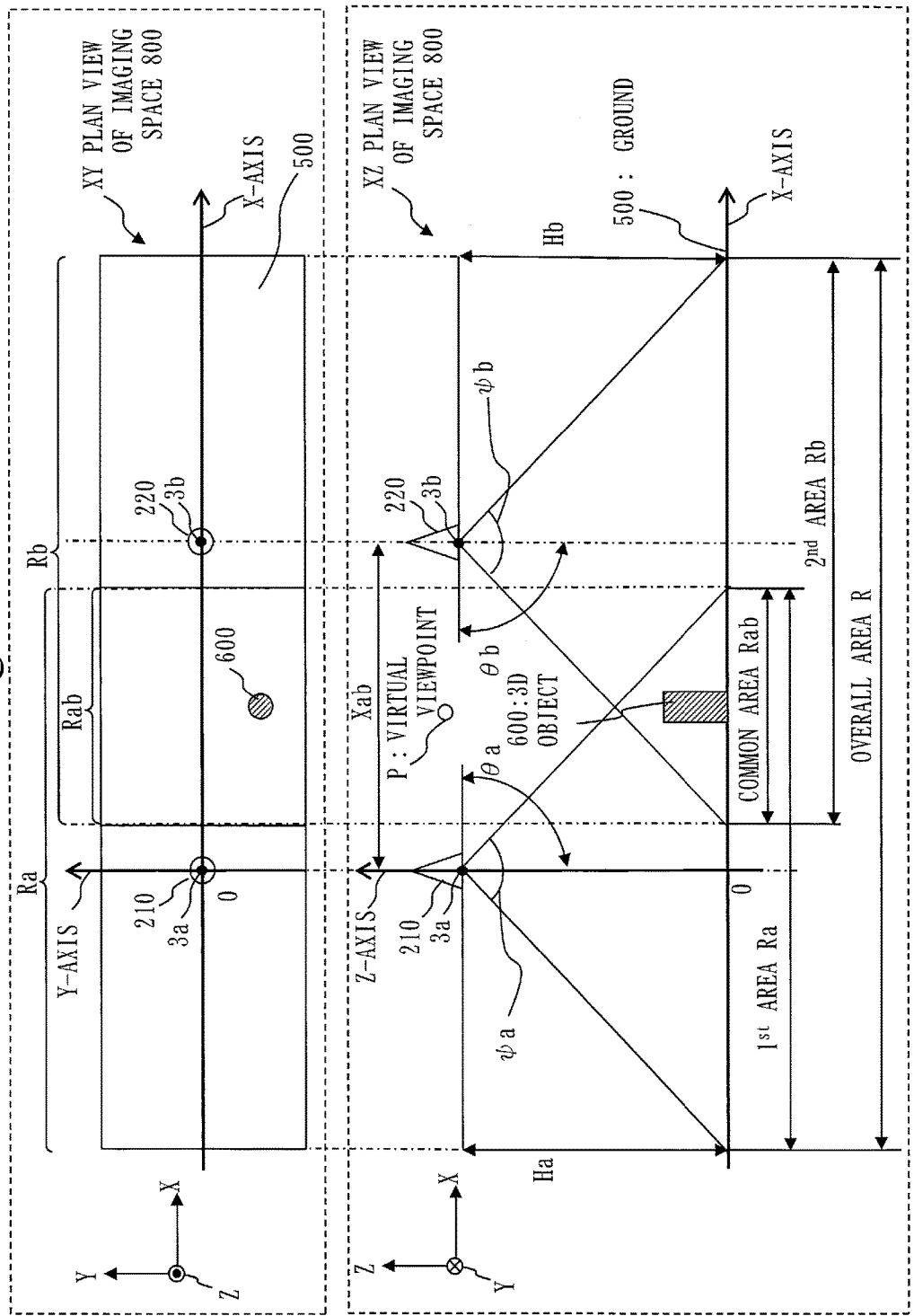
FIG. 2 is a diagram illustrating a positional relation between a first imaging device 210 and a second imaging device 220 according to the first embodiment.

FIG. 2 schematically illustrates the positional relation between the first imaging device 210 and the second imaging device 220 in an imaging space 800. The imaging space 800 is a space being an imaging subject of the first imaging device 210 and the second imaging device 220.

The first imaging device 210 and the second imaging device 220 are camera apparatuses equipped with imaging elements such as charged-coupled devices (CCD) or a complementary metal-oxide-semiconductor (CMOS), and a lens. The first imaging device 210 and the second imaging device 220 are equipped with the same kind of imaging elements and the same kind of lenses.

Each of the first imaging device 210 and the second imaging device 220 is, specifically, a stationary camera like a monitoring camera.

The center of an imaging element of the first imaging device 210 is an imaging element center $3a$. The center of an imaging element of the second imaging device 220 is an imaging element center $3b$. The imaging element center is also called a focus of a lens.

FIG. 2 illustrates an XZ plan view wherein the imaging space 800 is represented in an XZ plane in two dimensions defined by an X axis and a Z axis, and an XY plan view wherein the imaging space 800 is represented in an XY plane in two dimensions defined by an X axis and a Y axis.

The X axis is on the ground 500, representing a direction from the first imaging device 210 toward the second imaging device 220. That is, the imaging element center $3a$ of the first imaging device 210 and the imaging element center $3b$ of the second imaging device 220 are included in the XZ plane.

The Y axis is on the ground 500, representing a direction toward the rear face of FIG. 2 in the XZ plan view.

The Z axis represents a height direction from the ground 500. Further, the Z axis includes the imaging element center $3a$ of the first imaging device 210. The intersection of a perpendicular drawn down to the X axis from the imaging element center $3a$ of the first imaging device 210 and the X axis is the origin of an XYZ space representing the imaging space 800.

The first imaging device 210 and the second imaging device 220 are installed in the imaging space 800 on installation conditions as follows illustrated in FIG. 2.

The installation condition of the first imaging device 210 is that a height of the imaging element center $3a$ from the ground 500 is Ha, an angle of depression as an angle looking downward from a horizontal surface including the imaging element center $3a$ is $\theta a$, and an angle of view of a lens is $\psi a$. Further, the installation condition of the second imaging device 220 is that a height of the imaging element center $3b$ from the ground 500 is Hb, an angle of depression as an angle looking downward from a horizontal surface including the imaging element center $3b$ is $\theta b$, and an angle of view of a lens is $\psi b$. In FIG. 2, the angles of depression are expressed schematically.

Further, an interdevice distance between the imaging element center $3a$ of the first imaging device 210 and the imaging element center $3b$ of the second imaging device 220 is Xab. Xab is an X-axis component of the shortest distance between the imaging element center $3a$ of the first imaging device 210 and the imaging element center $3b$ of the second imaging device 220.

The first area Ra is an imaging range of the ground 500 by the first imaging device 210. That is, the first area Ra is a range of the ground 500 whose image is taken by the first imaging device 210. The second area Rb is an imaging range of the ground 500 by the second imaging device 220. That is, the second area Rb is a range of the ground 500 whose image is taken by the second imaging device 220. The common area Rab is a range where imaging areas of the first imaging device 210 and the second imaging device 220 overlap. The first imaging device 210 and the second imaging device 220 are installed so that the imaging areas partially overlap.

The three-dimensional object 600 is placed in the common area Rab. The three-dimensional object 600 is a photographic subject with a height, specifically, a human being, a car or an architectural structure.

An overall area R is an area composed of the first area Ra and the second area Rb. That is, the overall area R is the whole imaging area whose images are taken by the first imaging device 210 and the second imaging device 220. The installation conditions are preferably set such that an imaging scale of an image of the common area Rab whose image is taken by the first imaging device 210 is approximately the same as an imaging scale of an image of the common area Rab whose image is taken by the second imaging device 220. The imaging scale is a size of an image and a resolution of the image.

Further, a virtual viewpoint P represents a viewpoint of a bird's-eye view image generated in the image processing device 100. An image called a bird's-eye view image in the present embodiment denotes an image as seen from the virtual viewpoint P.

Next, the imaging device information 160 and the photographic subject information 170 stored in the storage unit 150 will be discussed.

The imaging device information 160 is information related to installation conditions of an imaging device set in the storage unit 150 beforehand. The information related to the installation conditions of the imaging device includes position information on a position of the imaging device, posture information on a posture of the imaging device and information on a resolution of the imaging device, etc. The position information includes a coordinate in the imaging space 800 of the imaging device. The posture information includes yaw, roll and pitch of the imaging device.

The imaging device information 160 includes the first device information 161 and the second device information 162.

The first device information 161 is information including position information, posture information and a resolution of the first imaging device 210 that takes an image of the first area Ra including the common area Rab. In the first device information 161, the position information, the posture information and the resolution of the first imaging device 210 that meet the installation conditions such as a height Ha from the ground 500, an angle of depression $\theta a$ and an angle of view of a lens $\psi a$ are set.

The second device information 162 is information including position information, posture information and a resolution of the second imaging device 220 that takes an image of the second area Rb including the common area Rab. In the second device information 162, the position information, the posture information and the resolution of the second imaging device 220 that meet the installation conditions such as a height Hb from the ground 500, an angle of depression θb and an angle of view of a lens ψb are set.

The first area Ra, the second area Rb, the common area Rab and the interdevice distance Xab is information determined beforehand from the first device information 161 and the second device information 162. The first area Ra, the second area Rb, the common area Rab and the interdevice distance Xab may be calculated beforehand and stored in the imaging device information 160. Otherwise, the first area Ra, the second area Rb, the common area Rab and the interdevice distance Xab may be calculated every time image processing is executed by the image processing device 100, and stored in the memory 922.

The photographic subject information 170 is information related to a photographic subject being a main imaging subject in an imaging area. The photographic subject is a three-dimensional object. The kind of the three-dimensional object being the photographic subject is determined beforehand as an imaging subject in the imaging area, and stored as one of the photographic subject information 170. The kind of the three-dimensional object is a kind that is determined beforehand as a main imaging subject in the imaging area.

The photographic subject information 170 includes height information 171. The height information 171 is information indicating a height from the ground 500 determined based on the kind of the three-dimensional object. The height information 171 is stored in the storage unit 150.

The height information 171 will be further described.

As a concrete example, when an imaging device is a camera for monitoring people, the kind of the three-dimensional object is a human being. In the photographic subject information 170, the kind of the three-dimensional object being the imaging subject, i.e., information on human beings, is set. Further, in the height information 171, information indicating the kind of the three-dimensional object, i.e., a height from the ground determined based on a human being is set. Specifically, based on the average height of human beings, information indicating a height from the ground determined in a preset method is set.

Further, as another concrete example, when an imaging device is a camera for monitoring cars, the kind of the three-dimensional object is a car. In the photographic subject information 170, information on cars is set. Further, in the height information 171, information indicating a height from the ground determined based on a car is set. Specifically, based on the average height of cars, information indicating a height from the ground determined in a preset method is set.

In the height information 171, a value that is slightly higher than the height of a three-dimensional object being an imaging subject from the ground, and that falls within an angle of view of a lens ψa of the first imaging device 210 and an angle of view of a lens ψb of the second imaging device 220 is set. Specifically, let us assume that an average value of heights of a certain kind of three-dimensional objects from the ground is calculated, and 1.2 times the average value is height information 171. In this case, it is necessary to set the installation condition of the imaging device such that 1.2 times the average value of the heights of three-dimensional objects being photographic subjects falls within the angle of view of the lens ψa and the angle of view of the lens ψb. Here, 1.2 times is only one example, and a setting method of the height information 171 may be any method, as long as the height information 171 is set appropriately by the method.

Next, a general description of image processing S100 of an image processing method 510 and an image processing program 520 according to the present embodiment will be discussed using FIG. 3.

The image processing S100 includes boundary calculation processing S110, bird's-eye view generation processing S120 and area image generation processing S150.

First, in the boundary calculation processing S110, the boundary calculation unit 110 calculates a boundary position 180 as a basis for dividing the common area Rab into a side of the first imaging device 210 and a side of the second imaging device 220, by using the first device information 161 on the first imaging device 210, the second device information 162 on the second imaging device 220, and the height information 171. The boundary calculation unit 110 stores the boundary position 180 calculated in the storage unit 150.

Next, in the bird's-eye view generation processing S120, the bird's-eye view generation unit 120 retrieves the first image 310 which is an image of the first area Ra taken by the first imaging device 210, and the second image 320 which is an image of the second area Rb taken by the second imaging device 220, from the memory 922. The first image 310 and the second image 320 are stored in the memory 922 by the input interface 930. The bird's-eye view generation unit 120 switches viewpoints between the first image 310 and the second image 320 respectively, and generates the first bird's-eye view image 311 and the second bird's-eye view image 321. In the first bird's-eye view image 311, the three-dimensional object 600 in the common area Rab is distorted due to the influence of switching viewpoints. Further, in the second bird's-eye view image 321, the three-dimensional object 600 in the common area Rab is distorted due to the influence of switching viewpoints.

Next, in the area image generation processing S150, the image processing device 100 generates an area image 340 being a bird's-eve view image of an overall area R viewed from the virtual viewpoint P. In the area image generation processing S150, the selection unit 130 performs selection processing S130, and the image generation unit 140 performs image generation processing S140.

The area image generation processing S150 is composed of the selection processing S130 and the image generation processing S140.

In the selection processing S130, the selection unit 130 selects a bird's-eye view image wherein distortion of an image of the three-dimensional object 600 is less as a selected image 330, out of the first bird's-eye view image 311 and the second bird's-eye view image 321 based on the boundary position 180 and the position of the three-dimensional object 600 placed in the common area Rab. That is, the boundary position 180 is used for determining which bird's-eye view image of the first bird's-eye view image 311 and the second bird's-eye view image 321 is adopted as a bird's-eye view image of the common area Rab at the time when a bird's-eye view image of the overall area R is generated.

In the image generation processing S140, the image generation unit 140 generates an image of the overall area R composed of the first area Ra and the second area Rb as the area image 340 by using an image of the first area Ra other than the common area Rab in the first bird's-eye view image 311, an image of the second area Rb other than the common area Rab in the second bird's-eye view image 321, and an image of the common area Rab included in the selected image 330. The image generation unit 140 outputs the area image 340 to a display apparatus such as a display via the output interface 940.

<Explanation of Boundary Calculation Processing S110>

Figure 4:
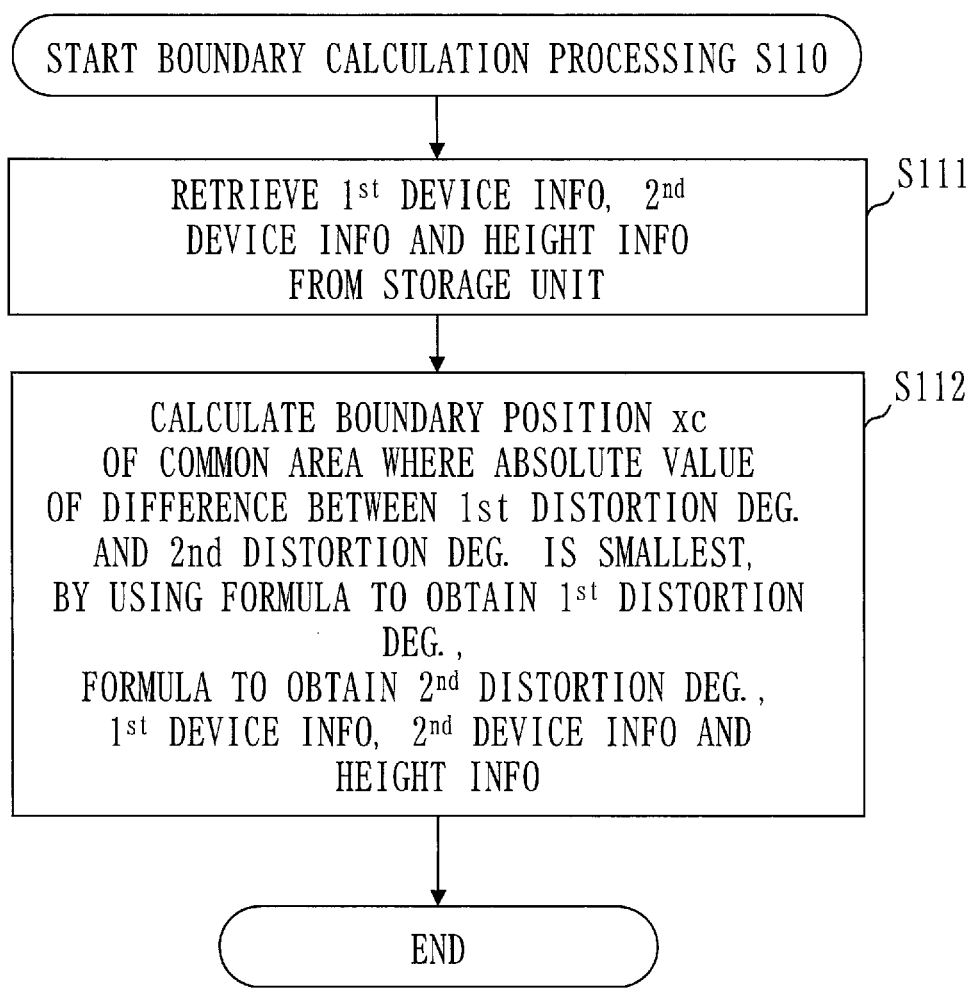
FIG. 4 is a flow diagram illustrating boundary calculation processing S110 according to the first embodiment.
Figure 5:
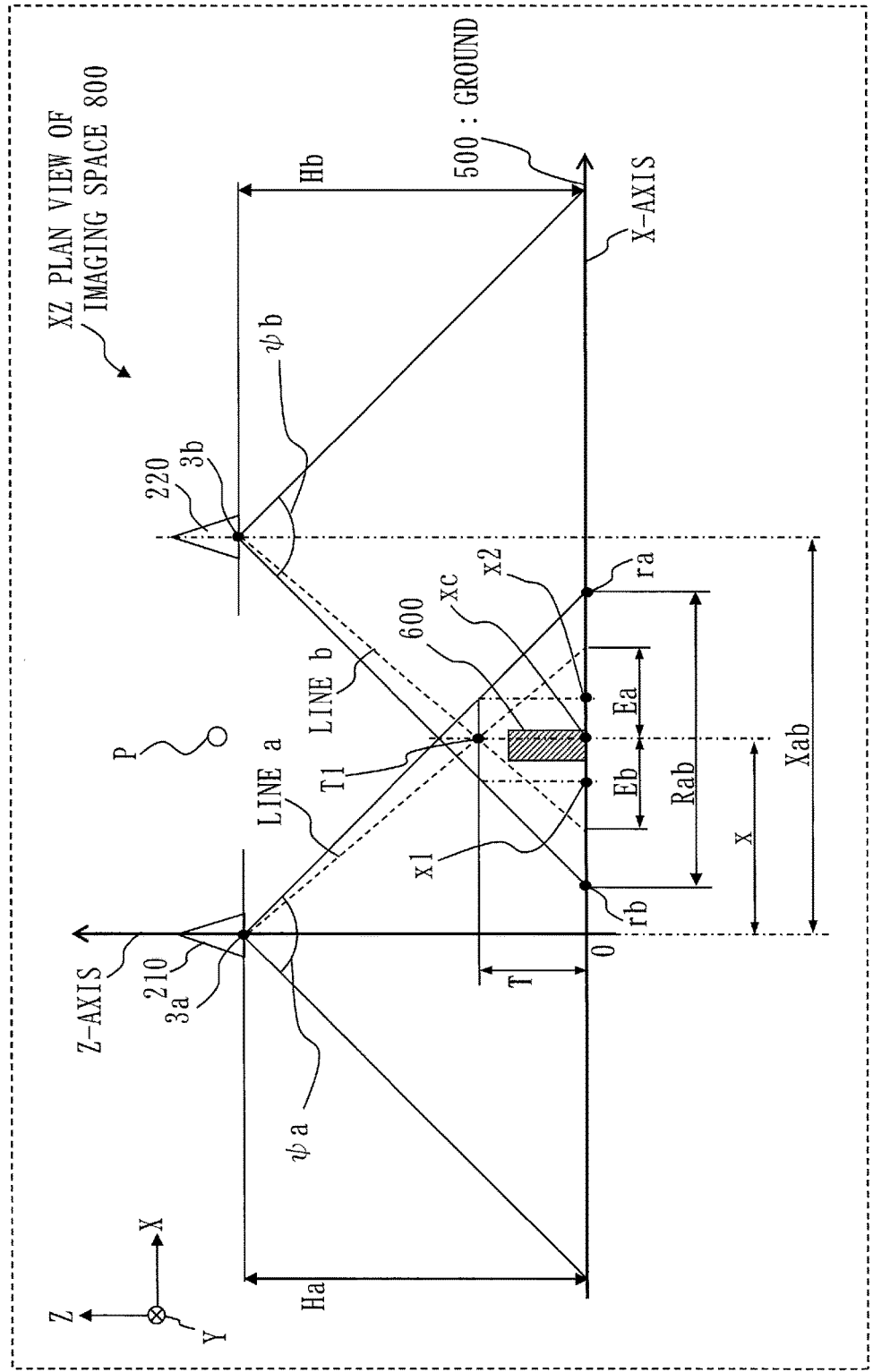
FIG. 5 is a diagram illustrating a calculation method of a boundary position xc in an imaging space 800 according to the first embodiment.

FIG. 4 is a flow diagram illustrating the boundary calculation processing S110 according to the present embodiment. FIG. 5 is a diagram for explaining a calculation method of the boundary position 180 in the imaging space 800 described in FIG. 2.

The boundary calculation processing S110 will be discussed in detail using FIG. 4 and FIG. 5.

In a step S111, the boundary calculation unit 110 retrieves the first device information 161, the second device information 162 and the height information 171 from the storage unit 150. A height Ha of the first imaging device 210 is included in the first device information 161. A height Hb of the second imaging device 220 is included in the second device information 162. Further, a value set in the height information 171 is T.

In a step S112, the boundary calculation unit 110 executes a geometric calculation using the first device information 161, the second device information 162 and the height information 171, and calculates a boundary position 180. Specifically, the boundary calculation unit 110 calculates xc being a position on the X-axis as the boundary position 180 by using the first distortion degree denoting a degree of distortion in the first bird's-eye view image 311 and the second distortion degree denoting a degree of distortion in the second bird's-eye view image 321.

In the following, there is a case wherein a value calculated as the boundary position 180 is denoted by a boundary position xc.

The first distortion degree is calculated by using the first device information 161 and the height information 171. The second distortion degree is calculated by using the second device information 162 and the height information 171. The boundary calculation unit 110 calculates a coordinate on the X axis of the common area Rab where an absolute value of a difference between the first distortion degree and the second distortion degree becomes the smallest as a boundary position xc.

The following formula 1 is a formula to obtain the first distortion degree Ea. The following formula 2 is a formula to obtain the second distortion degree Eb. A coordinate on the X axis is x.

$$Ea = x*T/(Ha-T) \quad \text{Formula 1}$$

$$Eb = (Xab-x)*T/(Hb-T) \quad \text{Formula 2}$$

The boundary calculation unit 110 calculates a coordinate x on the X axis where an absolute value of a difference between the first formula and the second formula becomes the smallest as the boundary position xc. The boundary calculation unit 110 stores the boundary position 180 calculated in the storage unit 150.

Here, the calculation method of the boundary position 180 will be further discussed using FIG. 5.

FIG. 5 is an XZ plan view indicating the positional relation between the first imaging device 210, the second imaging device 220 and the three-dimensional object 600 when the three-dimensional object 600 is placed in the common area Rab on the installation conditions of the imaging device described in FIG. 2.

An intersection point of a line a and a line b set to cross each other at a height T in the common area Rab is an intersection point T1. The line a is a straight line drawn from the imaging element center 3a to the common area Rab, and a line b is a straight line drawn from the imaging element center 3b to the common area Rab. The intersection point of a perpendicular line drawn from the intersection point T1 to the common area Rab and the ground 500, i.e., an intersection point with the X-axis, is a boundary position xc.

The distance in the X-axis direction between the intersection point of the line a with the ground 500, and the boundary position xc is the first distortion degree Ea.

The distance in the X-axis direction between the intersection point of the line b with the ground 500, and the boundary position xc is the second distortion degree Eb.

The both end parts of the common area Rab in the X-axis direction is an end part ra and an end part rb. When an intersection point of a perpendicular line drawn to the ground 500 from the intersection of the straight line 3a-ra and Z=T is x2, and an intersection point of a perpendicular line drawn to the ground 500 from the intersection of the straight line 3b-rb and Z=T is x1, the boundary position xc exists between x1 and x2.

The first distortion degree Ea and the second distortion degree Eb respectively represent degrees of distortion in projection images of the three-dimensional object 600 on the ground 500 by imaging devices. That is, the first distortion degree Ea represents a degree of distortion in the first bird's-eye view image 311, and the second distortion degree Eb represents a degree of distortion in the second bird's-eye view image 321. Further, by a geometric calculation based on FIG. 5, the first distortion degree Ea and the second distortion degree Eb are expressed by Formula 1 and Formula 2, respectively. Assuming that a difference between the first distortion degree Ea and the second distortion degree Eb is Δe, the boundary position xc is obtained by determining x so that Δe becomes the smallest value. That is, the boundary position xc is a position where the size of the first distortion degree Ea and the second distortion degree Eb reverses. In other words, the boundary position xc is a position where the first distortion degree Ea equalizes with the second distortion degree Eb.

<Explanation of Bird's-Eye View Generation Processing S120>

Figure 6:
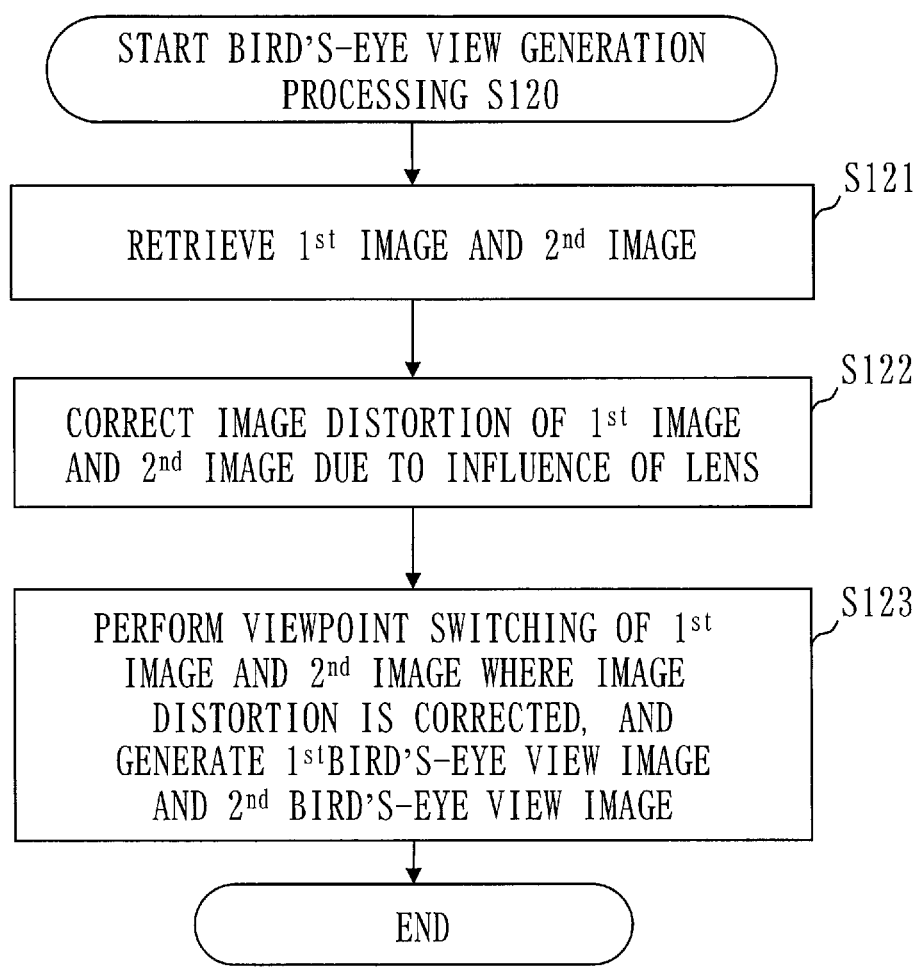
FIG. 6 is a flow diagram illustrating bird's-eye view generation processing S120 according to the first embodiment.

The bird's-eye view generation processing S120 according to the present embodiment will be discussed in detail using FIG. 6.

In a step S121, the bird's-eye view generation unit 120 retrieves the first image 310 and the second image 320 from the memory 922.

In a step S122, the bird's-eye view generation unit 120 performs lens distortion correction processing to correct image distortion due to influence of lenses of imaging devices for each of the first image 310 and the second image 320. Specifically, the bird's-eye view generation unit 120 performs lens distortion correction processing on each of the first image 310 and the second image 320 by using calculation parameters for correcting distortion of respective lenses in the first imaging device 210 and the second imaging device 220. The calculation parameters are obtained beforehand for each of the first imaging device 210 and the second imaging device 220, and stored in the imaging device information 160 in the storage unit 150. The bird's-eye view generation unit 120 retrieves the calculation parameters from the storage unit 150, and performs the lens distortion correction processing on each of the first image 310 and the second image 320 by using the calculation parameters retrieved.

In a step S123, the bird's-eye view generation unit 120 switches viewpoints from the first image 310 and the second image 320 whose distortion due to influence of the lenses has been corrected in the step S122, to the first bird's-eye view image 311 and the second bird's-eye view image 321. The first bird's-eye view image 311 and the second bird's-eye view image 321 are bird's-eye view images overlooking the ground 500 from the virtual viewpoint P. In particular, by using conversion determinants including operation parameters appropriate for generating bird's-eye view images overlooking the ground 500 from the virtual viewpoint P, the bird's-eye view generation unit 120 performs viewpoint switching processing on each of the first image 310 and the second image 320, and generates the first bird's-eye view image 311 and the second bird's-eye view image 321. The conversion determinants are stored in the imaging device information 160 in the storage unit 150 beforehand. The bird's-eye view generation unit 120 retrieves the conversion determinants from the storage unit 150, and performs the viewpoint switching processing on each of the first image 310 and the second image 320 by using the conversion determinants retrieved.

In each of the first bird's-eye view image 311 and the second bird's-eye view image 321, due to the influence of the viewpoint switching processing, the three-dimensional object 600 in the common area Rab is distorted.

<Explanation of Selection Processing S130>

Figure 7:
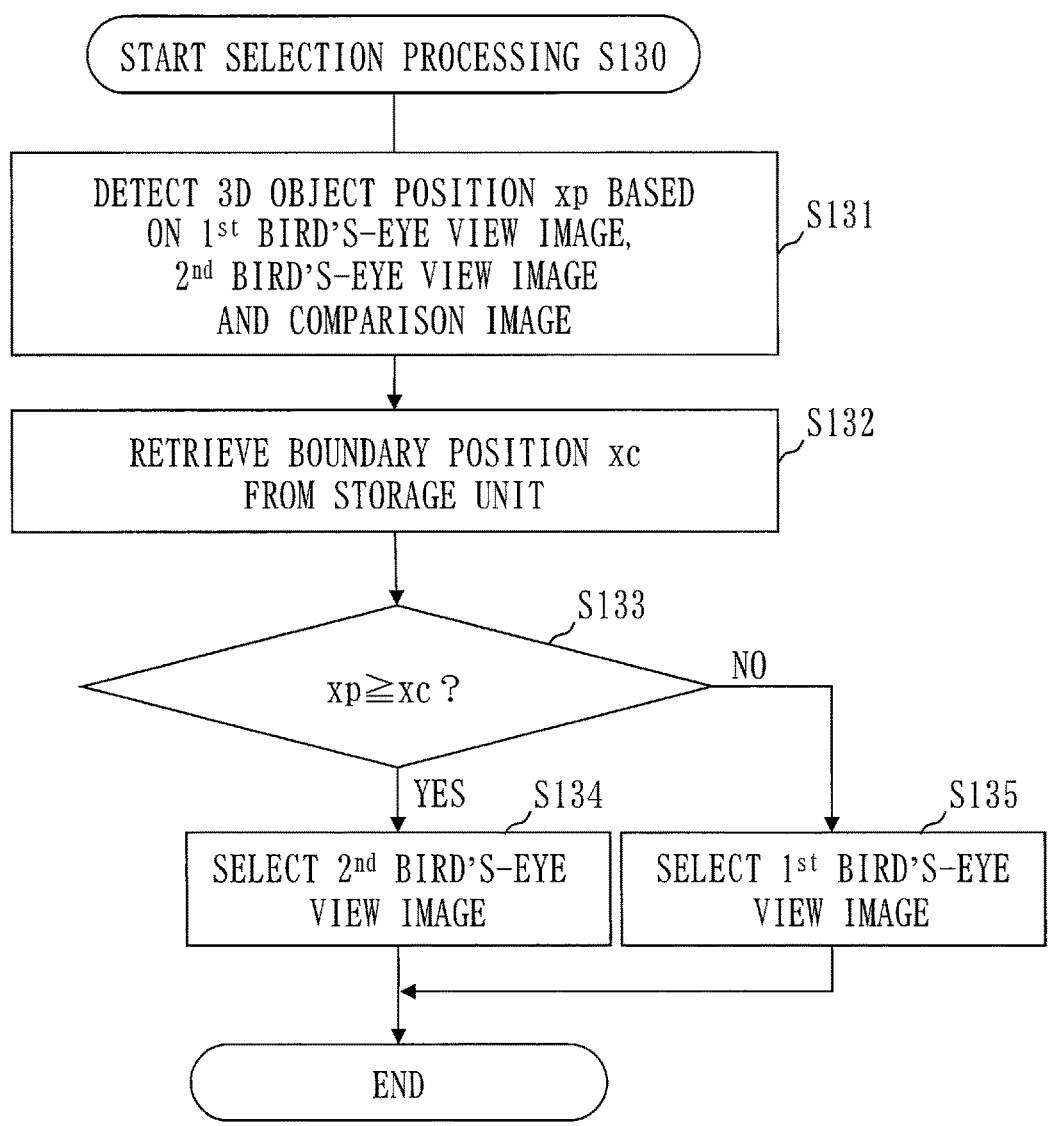
FIG. 7 is a flow diagram illustrating selection processing S130 according to the first embodiment.

The selection processing S130 according to the present embodiment will be discussed in detail using FIG. 7.

In a step S131, the position detection unit 131 retrieves the comparison image 190 from the storage unit 150, and calculates the position of the three-dimensional object 600 placed in the common area Rab as a three-dimensional object position xp based on the first bird's-eye view image 311, the second bird's-eye view image 321 and the comparison image 190. In particular, the position detection unit 131 detects the three-dimensional object position xp based on the comparison image 190, a bird's-eye view image of the common area Rab included in the first bird's-eye view image 311, and a bird's-eye view image of the common area Rab included in the second bird's-eye view image 321.

The comparison image 190 is a bird's-eye view image viewing a state without a three-dimensional object from the virtual viewpoint P in the common area Rab being a range where the first bird's-eye view image 311 and the second bird's-eye view image 321 overlap. That is, the comparison image 190 is a bird's-eye view image viewing a state wherein a three-dimensional object does not exist, i.e., the three-dimensional object is deleted, in the common area Rab, from the virtual viewpoint P. The comparison image 190 is generated beforehand, and stored in the storage unit 150.

A detection method of the three-dimensional object position xp will be described using FIG. 8.

The position detection unit 131 obtains a common bird's-eye view image 30a being a bird's-eye view image of the common area Rab included in the first bird's-eye view image 311, and a common bird's-eye view image 30b being a bird's-eye view image of the common area Rab included in the second bird's-eye view image 321.

Figure 8:
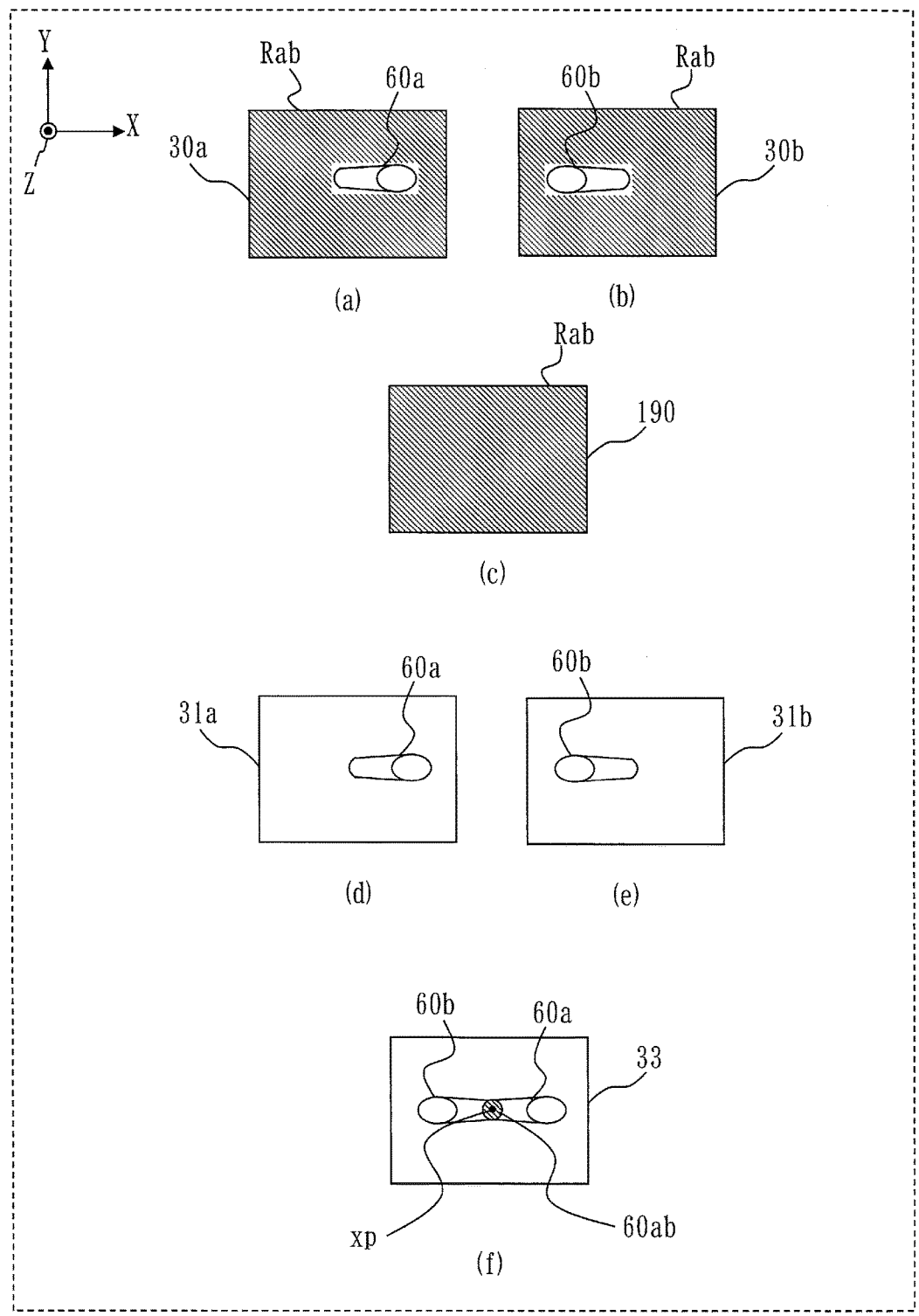
FIG. 8 is a diagram illustrating a detection method of a three-dimensional object position xp of a three-dimensional object 600 according to the first embodiment.

(a) in FIG. 8 is the common bird's-eye view image 30a of the first bird's-eye view image 311. An image of the three-dimensional object 600 indicated in the common bird's-eye view image 30a is a three-dimensional object image 60a. The three-dimensional object image 60a is an image of the three-dimensional object 600 for which a viewpoint has been switched from the first image 310, being an image as if the three-dimensional object 600 fell down toward the right side, i.e., the direction to separate away from the first imaging device 210.

(b) in FIG. 8 is the common bird's-eye view image 30b of the second bird's-eye view image 321. An image of the three-dimensional object 600 indicated in the common bird's-eye view image 30b is a three-dimensional object image 60b. The three-dimensional object image 60b is an image of the three-dimensional object 600 for which a viewpoint has been switched from the second image 320, being an image as if the three-dimensional object 600 fell down toward the left side, i.e., the direction to separate away from the second imaging device 220.

(c) in FIG. 8 is the comparison image 190 stored in the storage unit 150. The comparison image 190 is a bird's-eye view image of the common area Rab in a state without a three-dimensional object viewed from the virtual viewpoint P.

The position detection unit 131 takes a difference between the common bird's-eye view image 30a and the comparison image 190, and calculates a difference image 31a wherein the three-dimensional object image 60a is extracted. (d) in FIG. 8 illustrates the difference image 31a. Further, the position detection unit 131 takes a difference between the common bird's-eye view image 30b and the comparison image 190, and calculates a difference image 31b wherein the three-dimensional object image 60b is extracted. (e) in FIG. 8 illustrates the difference image 31b.

The position detection unit 131 performs blending processing, i.e., superposition processing of translucent images for the difference image 31a and the difference image 31b, and generates a synthesis image 33 wherein the difference image 31a and the difference image 31b are synthesized. (f) in FIG. 8 illustrates the synthesis image 33 wherein the three-dimensional object image 60a and the three-dimensional object image 60b are overlapped. In the synthesis image 33, a three-dimensional object overlapping part 60ab being a part wherein the three-dimensional object image 60a and the three-dimensional object image 60b are overlapped illustrates an area where the three-dimensional object 600 contacts the ground 500. The position detection unit 131 detects the X-coordinate of the center position of the three-dimensional object overlapping part 60ab as the three-dimensional object position xp being the position of the three-dimensional object 600.

Next, in a step S132, the image selection unit 132 retrieves the boundary position xc from the storage unit 150.

In a step S133, the image selection unit 132 selects a bird's-eye view image wherein distortion of an image of the three-dimensional object 600 is less as a selected image 330 out of the first bird's-eye view image 311 and the second bird's-eye view image 321 based on the boundary position xc retrieved, and the three-dimensional object position xp of the three-dimensional object 600 placed in the common area Rab.

Specifically, the image selection unit 132 determines whether the three-dimensional object position xp exists on the side of the first imaging device 210 or the side of the second imaging device 220 based on the boundary position xc. Then, the image selection unit 132 selects the first bird's-eye view image 311 as the selected image 330 when the three-dimensional object position xp exists on the side of the first imaging device 210 relative to the boundary position xc. Further, the image selection unit 132 selects the second bird's-eye view image 321 as the selected image 330 when the three-dimensional object position xp exists on the side of the second imaging device 220 relative to the boundary position xc.

The fact that the three-dimensional object position xp exists on the side of the first imaging device 210 relative to the boundary position xc means that the three-dimensional object position xp being the X-coordinate of the three-dimensional object 600 exists on the side of the first imaging device 210 relative to the boundary position xc. That is, it means that the three-dimensional object 600 is placed on the side of the first imaging device 210 relative to a straight line on the common area Rab wherein the boundary position xc is the X-coordinate.

Further, the fact that the three-dimensional object position xp exists on the side of the second imaging device 220 relative to the boundary position xc means that the three-dimensional object position xp being the X-coordinate of the three-dimensional object 600 exists on the side of the second imaging device 220 relative to the boundary position xc. That is, it means that the three-dimensional object 600 exists on the side of the second imaging device 220 relative to a straight line on the common area Rab wherein the boundary position xc is the X-coordinate.

In the step S133, when the three-dimensional object position xp is equal to or larger than the boundary position xc, the procedure proceeds to a step S134. The fact that the three-dimensional object position xp is equal to or larger than the boundary position xc means that the three-dimensional object position xp exists on the side of the second imaging device 220 relative to the boundary position xc. Therefore, in the step S134, the image selection unit 132 selects the second bird's-eye view image 321 as the selected image 330.

In the step 133, when the three-dimensional object position xp is smaller than the boundary position xc, the procedure proceeds to a step S135. The fact that the three-dimensional object position xp is smaller than the boundary position xc means that the three-dimensional object position xp exists on the side of the first imaging device 210 relative to the boundary position xc. Therefore, in the step S135, the image selection unit 132 selects the first bird's-eye view image 311 as the selected image 330.

<About Image Generation Processing S140>

Figure 9:
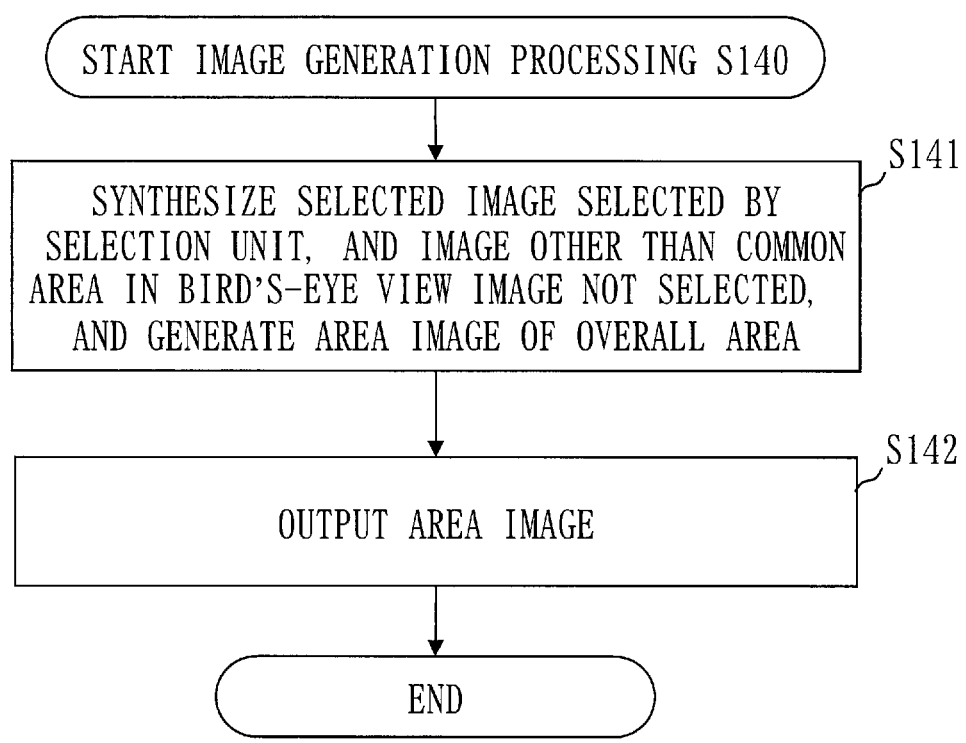
FIG. 9 is a flow diagram illustrating image generation processing S140 according to the first embodiment.

The image generation processing S140 according to the present embodiment will be described in detail using FIG. 9.

In a step 141, the image generation unit 140 generates an image of an overall area R composed of the first area Ra and the second area Rb as an area image 340 by using an image of the first area Ra other than the common area Rab in the first bird's-eye view image 311, an image of the second area Rb other than the common area Rab in the second bird's-eye view image 321, and an image of the common area Rab included in the selected image 330. That is, the image generation unit 140 synthesizes the selected image 330, and the image other than the common area Rab in the bird's-eye view image that is not selected in the selection processing S130, and generates the area image 340 of the overall area R viewed from the virtual viewpoint P.

In a step S142, the image generation unit 140 outputs the area image 340 to a display apparatus, such as a display, via the output interface 940.

A generation method of the area image 340 will be described using FIG. 10 and FIG. 11.

Figure 10:
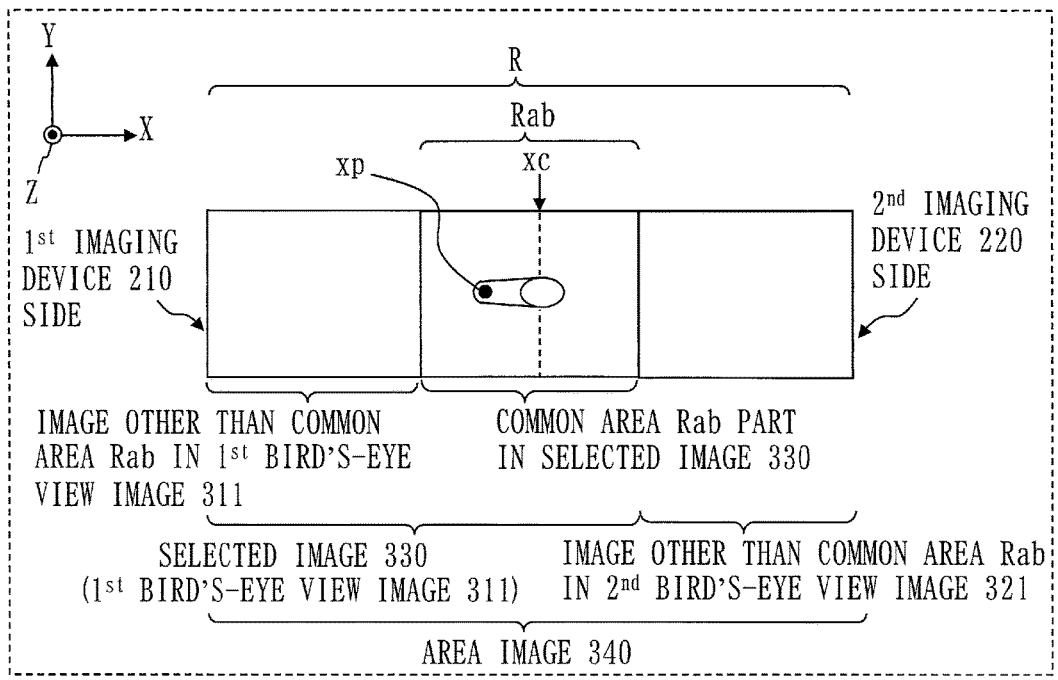
FIG. 10 is a diagram illustrating a generation method of an area image 340 according to the first embodiment.

In FIG. 10, since the three-dimensional object position xp exists on the side of the first imaging device 210 relative to the boundary position xc, the image selection unit 132 selects the first bird's-eye view image 311 as the selected image 330. That is, the image selection unit 132 synthesizes the first bird's-eye view image 311, and the image of the second area Rb obtained by removing the common area Rab from the second bird's-eye view image 321, and generates the area image 340 of the overall area R. That is, the area image 340 is generated from the image other than the common area Rab in the first bird's-eye view image 311, the image other than the common area Rab in the second bird's-eye view image 321, and the image of the common area Rab included in the first bird's-eye view image 311 being the selected image 330.

Figure 11:
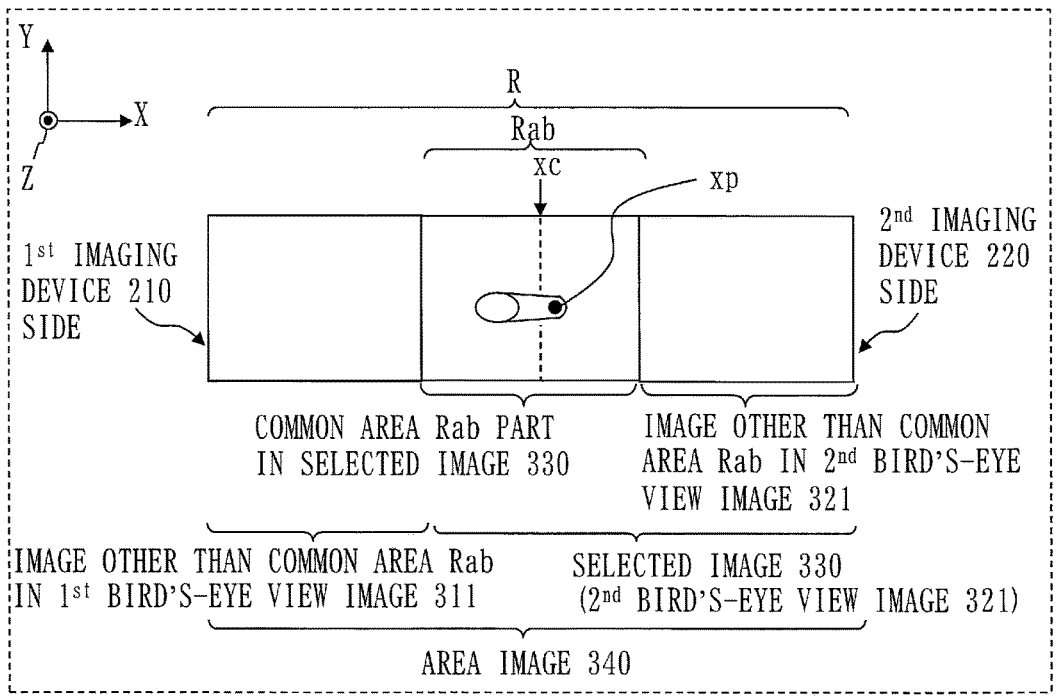
FIG. 11 is a diagram illustrating a generation method of the area image 340 according to the first embodiment.

In FIG. 11, since the three-dimensional object position xp exists on the side of the second imaging device 220 relative to the boundary position xc, the image selection unit 132 selects the second bird's-eye view image 321 as the selected image 330. That is, the image selection unit 132 synthesizes the second bird's-eye view image 321, and the image of the first area Ra obtained by removing the common area Rab from the first bird's-eye view image 311, and generates the area image 340 of the overall area R. That is, the area image 340 is generated from the image other than the common area Rab in the first bird's-eye view image 311, the image other than the common area Rab in the second bird's-eye view image 321, and the image of the common area Rab included in the second bird's-eye view image 321 being the selected image 330.

This concludes the explanation of the operation of the image processing device 100 according to the present embodiment.

Other Configuration

In the present embodiment, the image processing device 100 has a configuration wherein the first image 310 and the second image 320 are obtained via the input interface 930, and the area image 340 is output via the output interface 940. However, the image processing device 100 may include a communication device, and receive the first image 310 and the second image 320 via the communication device. Further, the image processing device 100 may transmit the area image 340 via the communication device. In this case, the communication device includes a receiver and a transmitter. Specifically, the communication device is a communication chip or a network interface card (NIC). The communication device functions as a communication unit to communicate data. The receiver functions as a receiving unit to receive data, and a transmitter functions as a transmitting unit to transmit data.

Further, in the present embodiment, the functions of the "units" in the image processing device 100 are realized by software; however, as another variation, the functions of the "units" in the image processing device 100 may be realized by hardware components.

The configuration of the image processing device 100 according to another variation of the present embodiment will be described using FIG. 12.

Figure 12:
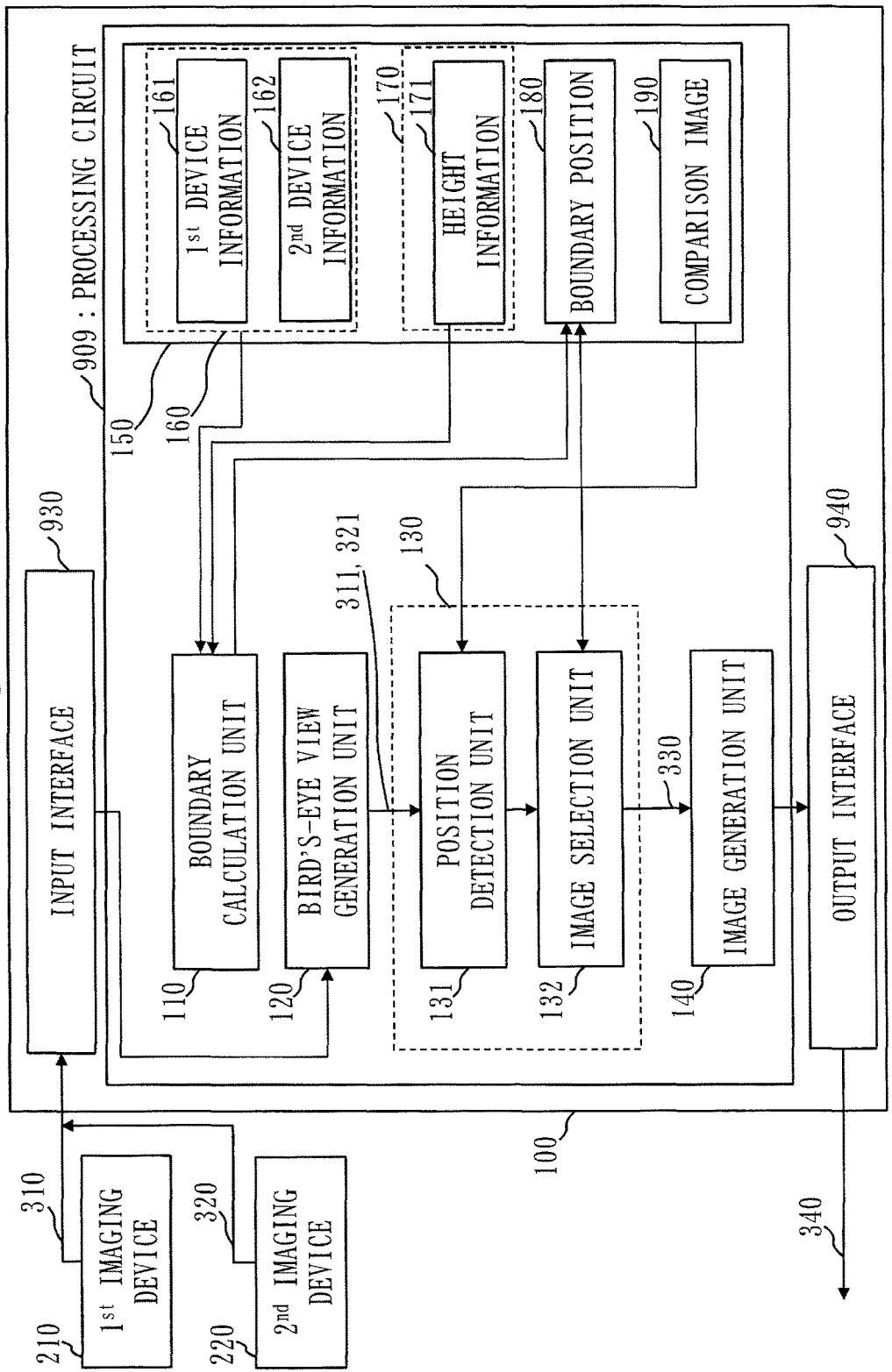
FIG. 12 is a diagram illustrating a configuration of the image processing device 100 according to an alternative of the first embodiment.

As illustrated in FIG. 12, the image processing device 100 includes hardware components such as a processing circuit 909, the input interface 930 and the output interface.

The processing circuit 909 is a dedicated electronic circuit for realizing the functions of the "units" as mentioned above, and the storage unit 150. The processing circuit 909 is specifically a single circuit, a composite circuit, a processor that has been made into a program, a processor that has been made into a parallel program, a logic IC, a gate array (GA), an application specific integrated circuit (ASIC) or an field-programmable gate array (FPGA).

The functions of the "units" may be realized by one processing circuit 909 or may be realized dispersedly by a plurality of processing circuits 909.

As another variation, the functions of the image processing device 100 may be realized by combination of software and hardware. That is, a part of the functions of the image processing device 100 may be realized by dedicated hardware, and the rest of the functions may be realized by software.

The processor 910, the storage device 920 and the processing circuit 909 are collectively referred to as "processing circuitry." That is, the functions of the "units" and the storage unit 150 are realized by the processing circuitry even when the configuration of the image processing device 100 is any of the configurations as illustrated in FIG. 1 and FIG. 10.

The "units" may be replaced with "steps," "procedures" or "processing." Further, the functions of the "units" may be realized by firmware.

Figure 3:
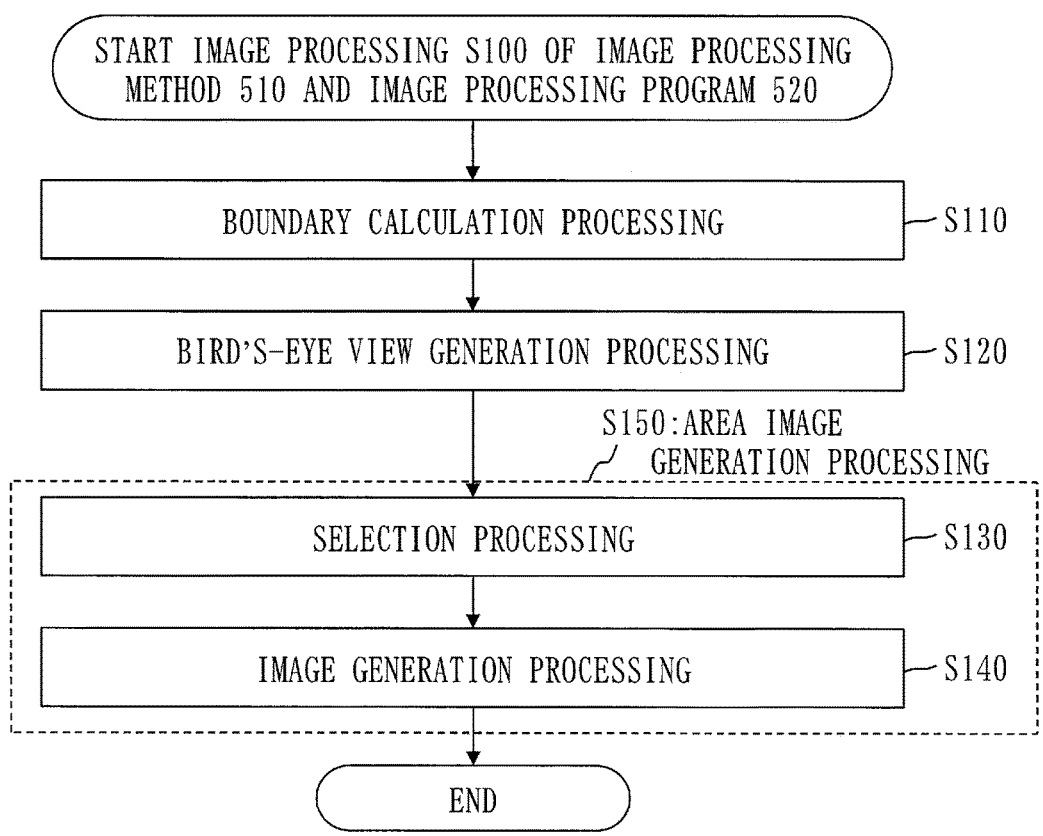
FIG. 3 is a flow diagram illustrating image processing S100 of an image processing method 510 and an image processing program 520 according to the first embodiment.

Further, when a plurality of area images are generated in sequence in the image processing device 100 according to the present embodiment, the boundary calculation processing S110 in FIG. 3 should be executed only when the first piece of area images is generated. Since the boundary position 180 calculated by the boundary calculation processing S110 is stored in the storage unit 150, in a case wherein the second and following area images are generated, the boundary position 180 stored in the storage unit 150 should be retrieved, and the bird's-eye view generation processing S120 through the image generation processing S140 should be performed.

Further, when the storage unit 150 is realized by the auxiliary storage device 921, information retrieved from the storage unit 150 is stored in the memory 922 at the time of processing of generating the first piece of area images. Accordingly, there is no necessity of retrieval from the auxiliary storage device 921 in the processing of generating the second and following area images.

Figure 13:
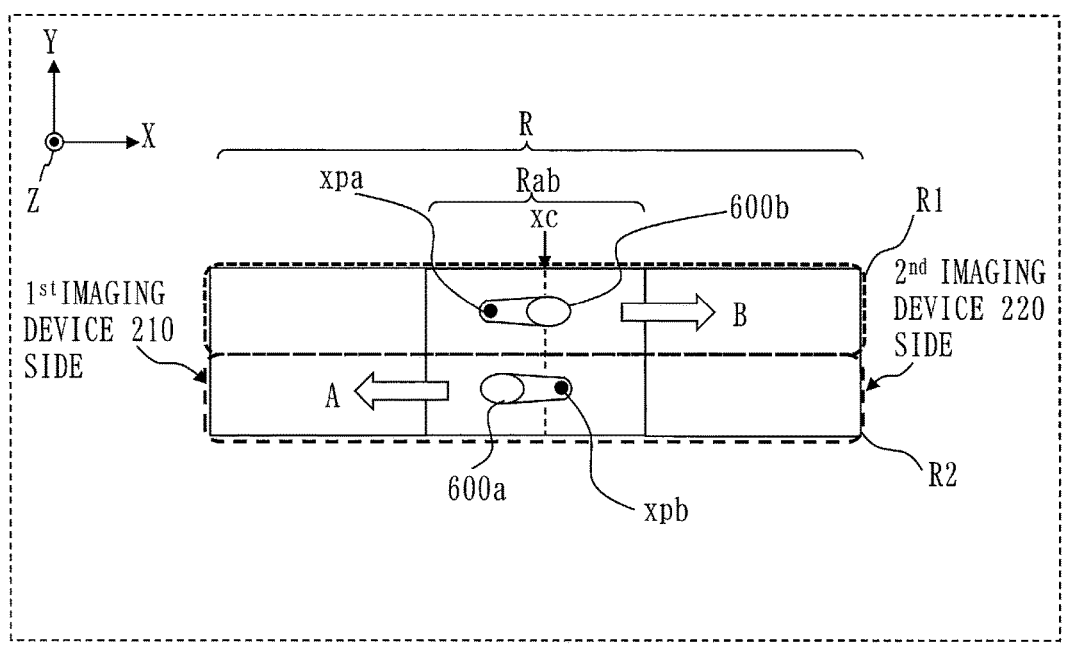
FIG. 13 is a diagram illustrating an application example of the image processing device 100 according to the first embodiment.

Next, an application example of the image processing device 100 according to the present embodiment will be described using FIG. 13. As illustrated in FIG. 13, there is a case where a plurality of areas wherein the moving direction of three-dimensional objects being photographic subjects is constant exist in the overall area R of the imaging area. Specifically, there is a case wherein cars going through a road in two ways are photographic subjects.

In such a case, it is only necessary that the overall area R is divided for each area where the moving direction of three-dimensional objects is constant, and the image processing S100 as mentioned above is performed for each area divided. Specifically, as illustrated in FIG. 13, in the overall area R, the area R1 being a traffic lane where a three-dimensional object 600*b* moves in B direction, and the area R2 being a traffic lane where a three-dimensional object 600*a* moves in A direction exist. The image processing device stores in the storage unit beforehand imaging device information wherein the overall area R is divided into the area R1 and the area R2 and defined. Then, the image processing device performs the image processing S100 in each area of the area R1 and the area R2, and generates a bird's-eye view image of the area R1 and a bird's-eye view image of the area R2. Then, the image processing device synthesizes the bird's-eye view image of the area R1 and the bird's-eye view image of the area R2, and generates an area image of the overall area R.

Explanation of Effect of Present Embodiment

As mentioned above, the image processing device according to the present embodiment determines, by letting a boundary position where the difference of the degree of distortion in a three-dimensional object becomes the smallest value be a boundary, which side of the boundary position the three-dimensional object position is situated. Then, based on the determination result, by performing selection processing of a bird's-eye view image to be displayed as an image of a common area, a bird's-eye view image wherein the degree of distortion in the three-dimensional object is smaller is selected. Therefore, by the image processing device according to the present embodiment, the image of a three-dimensional object does not become an unnatural image such as to be displayed doubly, and a synthesis bird's-eye view image of the three-dimensional object only with little distortion is obtained.

Further, in the image processing device according to the present embodiment, imaging device information on installation conditions of an imaging device, and height information determined by a kind of a photographic subject are stored in the storage unit beforehand. That is, in the image processing device according to the present embodiment, the most appropriate imaging device information and height information can be set depending on the status of use. Therefore, by the image processing device according to the present embodiment, since a selected image to be displayed as a bird's-eye view image of a common area can be selected based on appropriate imaging device information and height information, a synthesis bird's-eye view image with a high image quality can be provided.

Further, in the image processing device according to the present embodiment, since a comparison image in a state wherein a photographic subject does not exist in the common area is prepared beforehand in the storage unit, the position of the three-dimensional object can be detected based on the comparison image and the bird's-eye view image generated. Thus, by the image processing device according to the present embodiment, since there is no need to use an apparatus like a sensor for detecting the position of the three-dimensional object, it is possible to reduce the cost.

Second Embodiment

In the present embodiment, parts different from those in the first embodiment will be mainly discussed.

In the first embodiment, image processing in a case wherein one three-dimensional object exists in the common area Rab is described. Further, in the first embodiment, an area image is generated while the image of the three-dimensional object which has been switched a viewpoint remains distorted. In the present embodiment, when n pieces (n is a natural number equal to or larger than 1) of three-dimensional objects exist in the common area Rab, an image processing device 100*a* to display images of the three-dimensional objects after being reduced distortion, by performing compression deformation of the images of each three-dimensional object which have been switched viewpoints, will be discussed.

Explanation of Configuration

Figure 14:
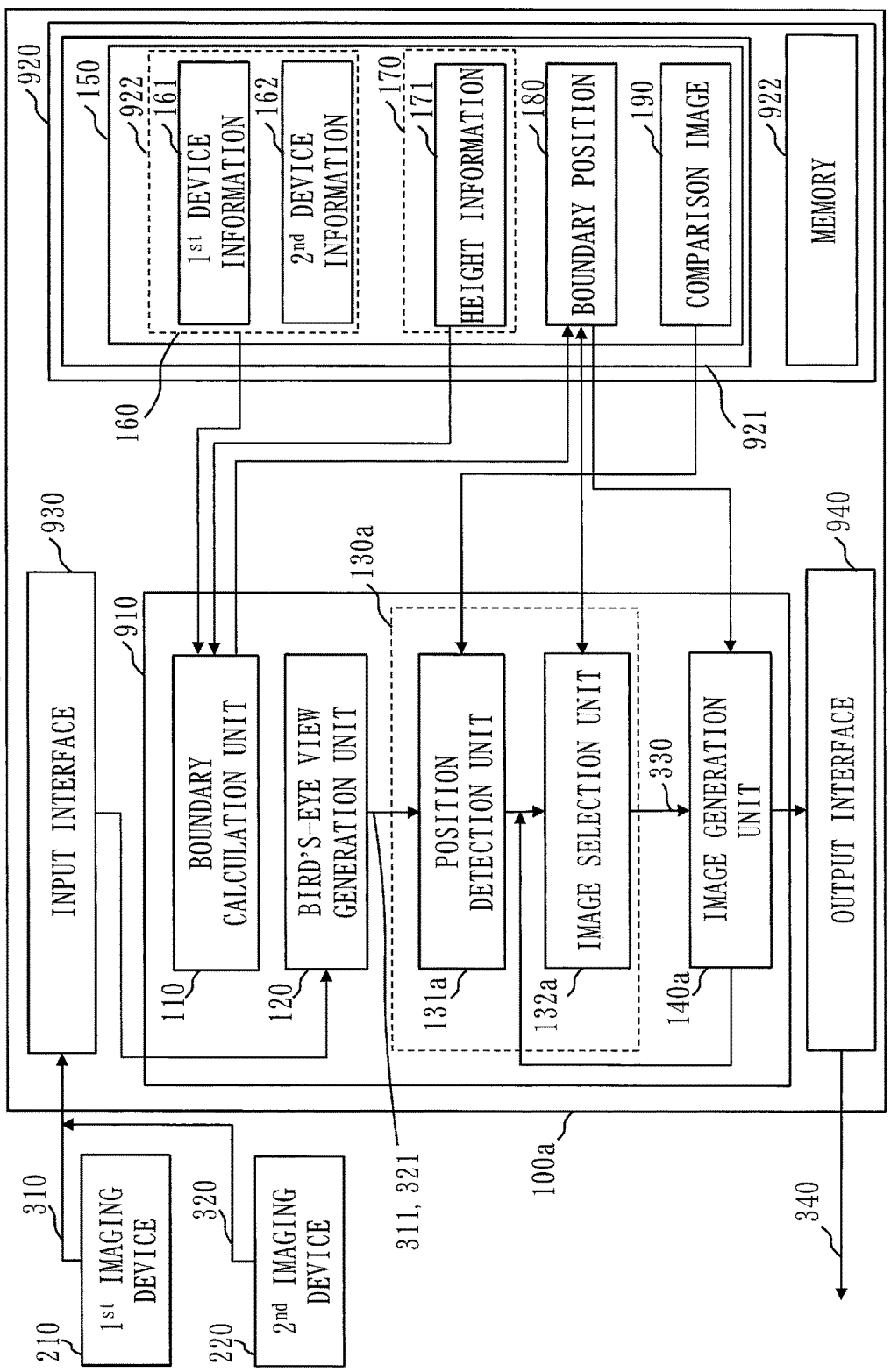
FIG. 14 is a diagram illustrating a configuration of an image processing device 100a according to a second embodiment.

The configuration of the image processing device 100*a* according to the present embodiment will be discussed using FIG. 14.

In the present embodiment, the same configuration as the configuration described in the first embodiment is denoted by the same signs, and explanation thereof is omitted.

The image processing device 100*a* is equipped with a selection unit 130*a* and an image generation unit 140*a* as function configurations instead of the selection unit 130 and the image generation unit 140 in the first embodiment. That is, the image processing device 100*a* is equipped with a position detection unit 131*a* and an image selection unit 132*a* as function configurations instead of the position detection unit 131 and the image selection unit 132. In the present embodiment, the functions of the "units" in the image processing device 100a are the functions of the boundary calculation unit 110, the bird's-eye view generation unit 120, the position detection unit 131a, the image selection unit 132a and the image generation unit 140a.

Explanation of Operation

Figure 15:
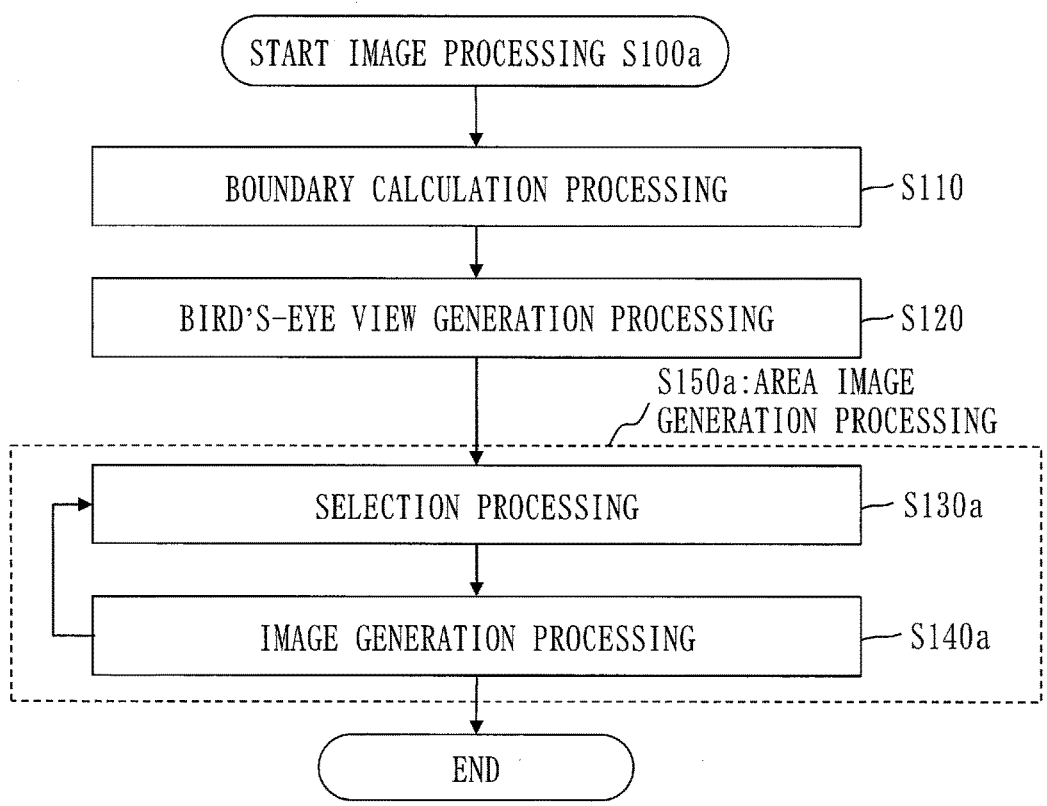
FIG. 15 is a flow diagram illustrating image processing S100a of the image processing device 100a according to the second embodiment.

Image processing S100a of the image processing device 100a according to the present embodiment will be discussed using FIG. 15. In the present embodiment, area image generation processing S150a is different from the area image generation processing S150 of the first embodiment. That is, selection processing S130a and image generation processing S140a are different from the selection processing S130 and the image generation processing S140 in the first embodiment.

In the area image generation processing S150a, the image processing device 100a corrects distortion in each image of three-dimensional object images 601, 602, . . . , 60n after being switched viewpoints, of n pieces of three-dimensional objects in the common area Rab by performing compression deformation.

Figure 16:
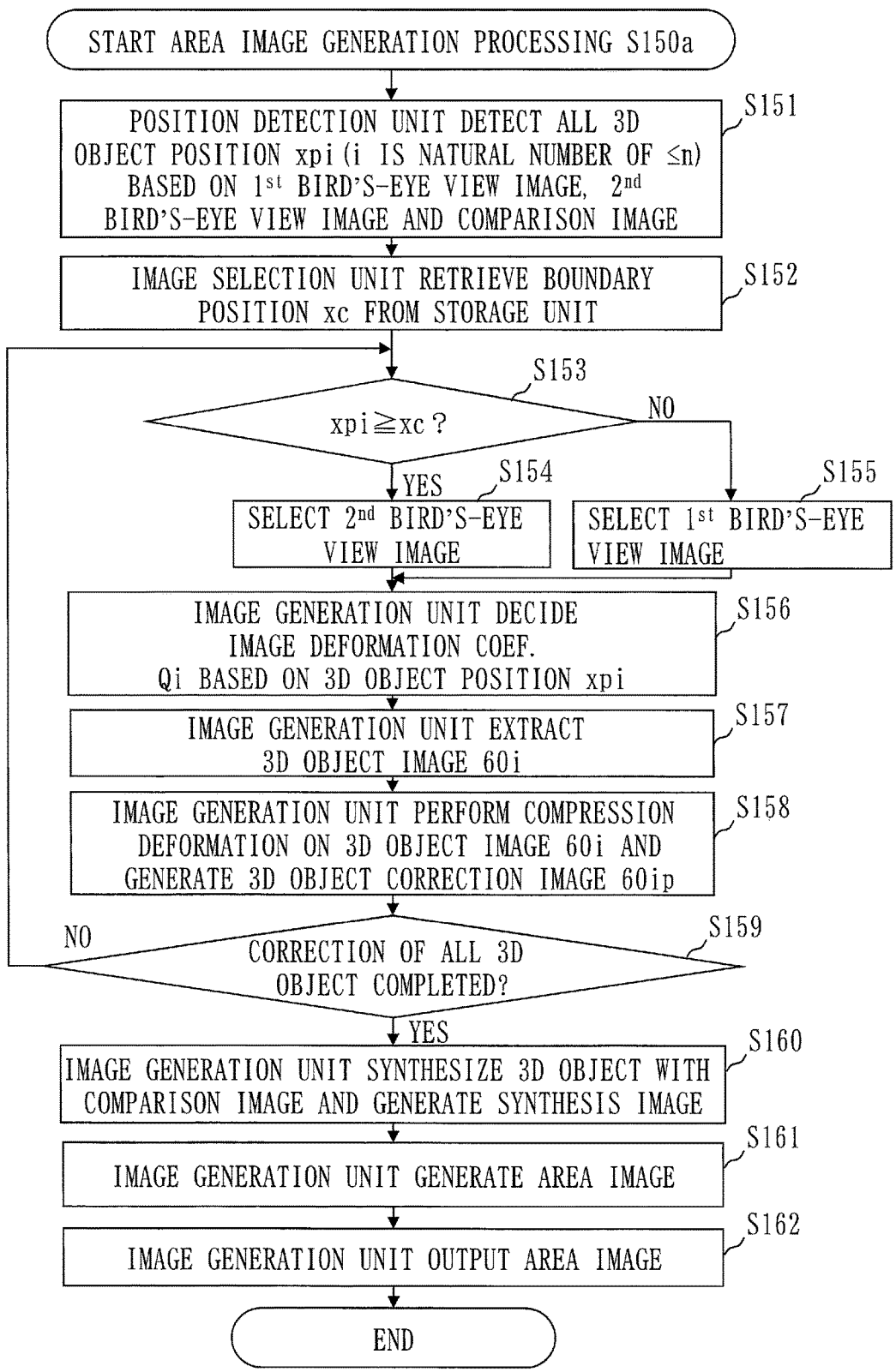
FIG. 16 is a flow diagram illustrating area image generation processing S150a according to the second embodiment.

The area image generation processing S150a according to the present embodiment will be discussed using FIG. 16.

In a step S151, the position detection unit 131a retrieves a comparison image 190 from the storage unit 150. The position detection unit 131a calculates each three-dimensional object position xpi (i is a natural number equal to or smaller than n) of n pieces of three-dimensional objects placed in the common area Rab, based on the first bird's-eye view image 311, the second bird's-eye view image 321 and the comparison image 190. That is, the position detection unit 131a detects the three-dimensional object positions xp1, xp2, . . . , xpn. A detection method of each three-dimensional object position xpi in the step S151 is the same as the step S131 described in the first embodiment.

In a step S152, the image selection unit 132a retrieves a boundary position xc from the storage unit 150. The processing in the step S152 is the same as the step S132 described in the first embodiment.

In a step S153, the image selection unit 132a selects a bird's-eye view image wherein distortion in three-dimensional object images 60i is less as a selected image 330, out of the first bird's-eye view image 311 and the second bird's-eye view image 321, based on the boundary position xc, and the three-dimensional object positions xpi placed in the common area Rab. The three-dimensional object images 60i are three-dimensional object images of subjects to be processed. The image selection unit 132a selects the first bird's-eye view image 311 as a selected image 330 when a three-dimensional object positions xpi is on the side of the first imaging device 210 relative to the boundary position xc (step S155). Further, the image selection unit 132a selects the second bird's-eye view image 321 as a selected image 330 when a three-dimensional object position xpi is on the side of the second imaging device 220 relative to the boundary position xc (step S154). The processing from the step S153 through the step S155 is the same as the step S133 through the step 135 described in the first embodiment.

Figure 17:
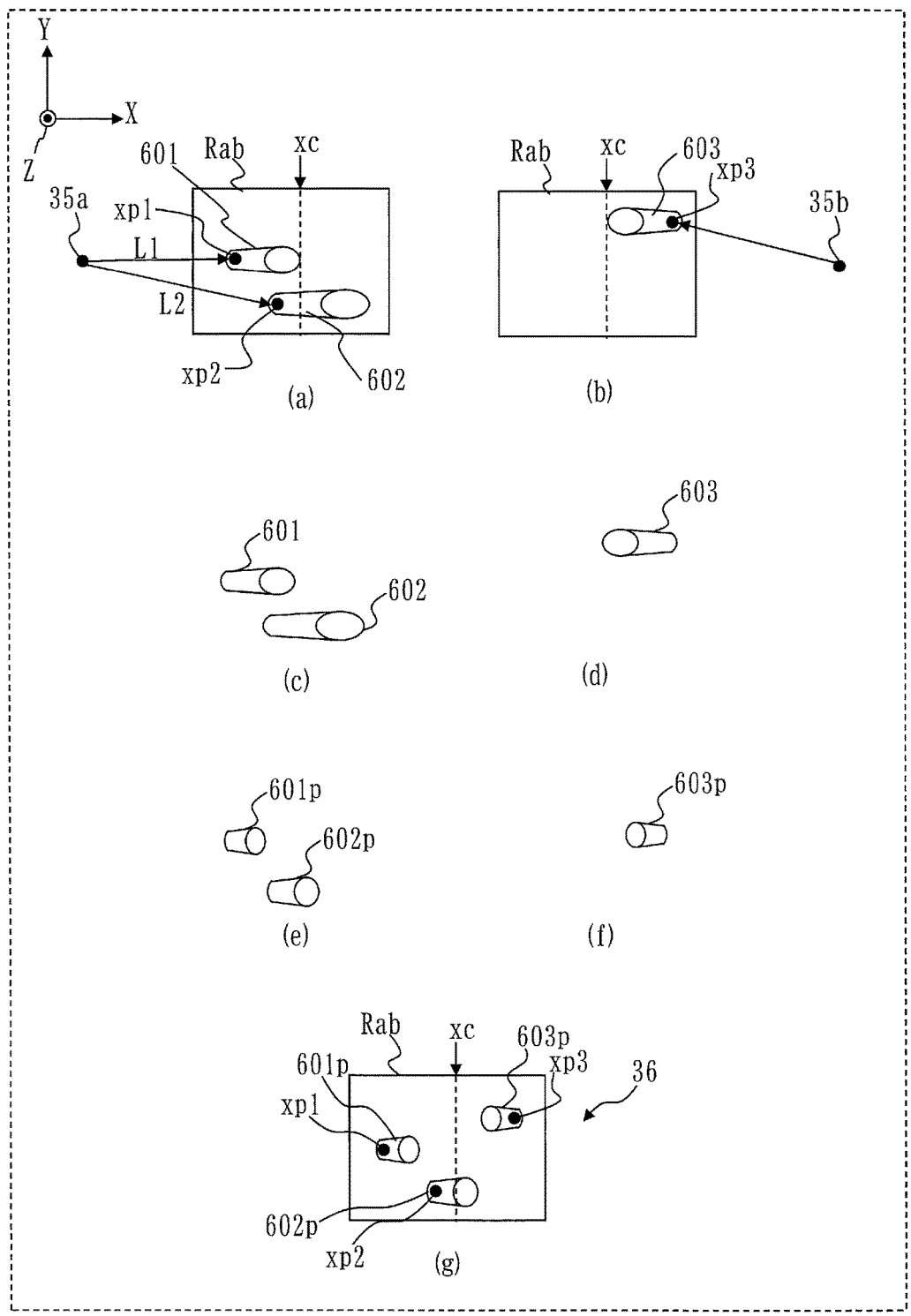
FIG. 17 is a diagram illustrating area image generation processing S150a according to the second embodiment.

FIG. 17 is a diagram for describing the area image generation processing S150a according to the present embodiment.

As a specific example, it is assumed that three three-dimensional objects are placed in the common area Rab. Further, it is assumed that each of three-dimensional object positions xp1, xp2 and xp3 of three three-dimensional objects are detected. As illustrated in (a) of FIG. 17, the three-dimensional object positions xp1 and xp2 are on the side of the first imaging device 210 relative to the boundary position xc. Further, as illustrated in (b) of FIG. 17, the three-dimensional object position xp3 is on the side of the second imaging device 220 relative to the boundary position xc.

Thus, as a bird's-eye view image of the three-dimensional objects positioned respectively at the three-dimensional object positions xp1 and xp2, the first bird's-eye view image 311 is selected. The bird's-eye view images of the three-dimensional objects placed respectively at the three-dimensional object positions xp1 and xp2 are three-dimensional object images 601 and 602. As a bird's-eye view image of the three-dimensional object positioned at the three-dimensional object position xp3, the second bird's-eye view image 321 is selected. The bird's-eye view image of the three-dimensional object placed at the three-dimensional object position xp3 is a three-dimensional object image 603.

Further, 35a in (a) of FIG. 17 represents a position where a coordinate position of the imaging element center 3a of the first imaging device 210 is mapped to the XY plane after switching bird's-eye view images. 35b in (b) of FIG. 17 represents a position where a coordinate position of the imaging element center 3b of the second imaging device 220 is mapped to the XY plane after switching bird's-eye view images.

In a step S156, the image generation unit 140a determines an image deformation coefficient Qi to define a deformation degree at the time of performing compression deformation of a three-dimensional object image 60i based on the three-dimensional object position xpi. The image deformation coefficient is also referred to as a deformation rate. The image generation unit 140a determines the image deformation coefficient Qi based on the length of the distance between an imaging element center of an imaging device and the three-dimensional object position xpi. The longer the distance between the imaging element center of the imaging device and the three-dimensional object position xpi is, the larger the image deformation coefficient Qi is.

In the examples of (a) and (b) of FIG. 17, the distance L2 between 35a and the three-dimensional object position xp2 is longer than the distance L1 between 35a being the imaging element center and the three-dimensional object position xp1. Thus, the image deformation coefficient Q2 of the three-dimensional object image 602 is determined to be a value larger than the image deformation coefficient Q1 of the three-dimensional object image 601. Specifically, an operation expression with a three-dimensional object position xp as a variable is stored beforehand in the storage unit 150, and the image generation unit 140a calculates the image deformation coefficient Qi by using the operation expression and the three-dimensional object position xpi stored in the storage unit 150. Further, an image deformation coefficient table with the three-dimensional object position xp as a parameter may be stored beforehand in the storage unit 150, and the image generation unit 140a may retrieve a value corresponding to xpi as the image deformation coefficient Qi from the image deformation coefficient table stored in the storage unit 150.

In a step S157, the image generation unit 140a extracts the three-dimensional object images 60i from the selected image 330. Specifically, the image generation unit 140a extracts the three-dimensional object images 60i using the common area Rab part in the selected image 330 and the comparison image 190. (c) and (d) of FIG. 17 are three-dimensional object images 601, 602 and 603 extracted by the image generation unit 140a. The three-dimensional object images 601 and 602 are extracted from the first bird's-eye view image 311 being the selected image 330. Further, the three-dimensional object image 603 is extracted from the second bird's-eye view image 321 being the selected image 330.

In a step S158, the image generation unit 140a performs compression deformation processing on the three-dimensional object images 60i extracted, using the image deformation coefficients Qi. The compression deformation processing is processing to perform correction to decrease deformation in the three-dimensional object images 60i by performing compression deformation on the three-dimensional object images 60i using the image deformation coefficients Qi. The three-dimensional object correction images 601p and 602p in (e) of FIG. 17 represent results of compression deformation processing performed on each of the three-dimensional object images 601 and 602 in (c) of FIG. 17. As mentioned above, the image deformation coefficient Q2 for the three-dimensional object image 602 is determined to be larger than the image deformation coefficient Q1 for the three-dimensional object image 601.

Further, a three-dimensional object correction image 603p in (f) of FIG. 17 represents a result of compression deformation processing performed on the three-dimensional object image 603 in (d) of FIG. 17.

It is preferable that the compression deformation for a three-dimensional object image is performed in a linear direction connecting an imaging element center and the center of the three-dimensional object image in a bird's-eye view image.

In a step S159, the image generation unit 140a determines whether a three-dimensional object on which compression deformation processing has not been performed out of n pieces of three-dimensional objects remains or not. That is, the image generation unit 140a determines whether correction by compression deformation for all three-dimensional objects in the common area Rab is completed or not.

In a step S159, when correction for all the three-dimensional objects is completed, the procedure proceeds to a step S160.

When a three-dimensional object on which correction has not been completed remains in the step S159, the procedure returns to the step S153, and processing is performed on the next three-dimensional object image in the three-dimensional object images 60i.

In the step S160, the image generation unit 140a attaches each of the three-dimensional object correction images 601p, 602p, . . . , 60np on which compression deformation processing has been performed to each three-dimensional object position xp1, xp2, . . . , xpn on the comparison image 190, and generates a correction common image 36. (g) in FIG. 17 illustrates a correction common image 36 wherein the three-dimensional object correction images 601p, 602p and 603p are attached respectively to the three-dimensional object positions xp1, xp2 and xp3 in the comparison image 190.

In a step S161, the image generation unit 140a generates an area image 340 of the overall area R using an image other than the common area Rab in the first bird's-eye view image 311, an image other than the common area Rab in the second bird's-eye view image 321, and the correction common image 36.

In a step S162, the image generation unit 140 outputs the area image 340 to a display apparatus such as a display, etc. via the output interface 940.

This concludes the explanation of the area image generation processing S150a according to the present embodiment.

Explanation of Effect according to Present Embodiment

As mentioned above, by the image processing device according to the present embodiment, a three-dimensional image to be performed compression deformation can be selected based on a three-dimensional object position and a boundary position, and the three-dimensional object image selected can be performed compression deformation, with respect to a plurality of three-dimensional objects existing in a common area. Therefore, by the image processing device according to the present embodiment, deformation in a three-dimensional object image in the common area can be reduced, and image quality of a synthesis bird's-eye view image can be improved.

Further, by the image processing device according to the present embodiment, deformation can be reduced for each three-dimensional object by extracting a three-dimensional object image, and by performing compression deformation only on the three-dimensional object image extracted. Thus, by the image processing device according to the present embodiment, since deformation due to correction does not occur in an area for which compression is unnecessary, the quality of the synthesis bird's-eye view image can be improved further.

In the above, the first and second embodiments are described; however, any one or any arbitrary combination of what are described as the "units" in the explanation of those embodiments may be adopted. That is, functional blocks of the image processing device are arbitrary as long as the functional blocks can realize the functions as described in the above embodiments. The image processing device may be configured by any combination of or arbitrary block configuration of those functional blocks. Further, the image processing device may not be one device, but may be an image processing system configured by a plurality of devices.

Further, the first and second embodiments are described; meanwhile more than one of those two embodiments may be partially combined and implemented. Otherwise, one embodiment of those two embodiments may be partially implemented. Additionally, those two embodiments may be implemented partially or as a whole, in any combined manner.

Note that the embodiments as mentioned above are essentially preferable examples, not aiming at limiting the range of the present invention, application and use thereof, and various alterations can be made as needed.

REFERENCE SIGNS LIST 3a, 3b: imaging element center; 100, 100a: image processing device; 110: boundary calculation unit; 120: bird's-eye view generation unit; 130, 130a: selection unit; 131, 131a: position detection unit; 132,132a: image selection unit; 140, 140a: image generation unit; 150: storage unit; 160: imaging device information; 161: first device information; 162: second device information; 170: photographic subject information; 171: height information; 180: boundary position; 190: comparison image; 210: first imaging device; 220: second imaging device; 310: first image; 320: second image; 311: first bird's-eye view image; 321: second bird's-eye view image; 330: selected image; 340: area image; 30a, 30b: common bird's-eye view image; 31a, 31b: difference image; 33: synthesis image; 36: correction common image; 500: ground; 510: image processing method; 520: image processing program; 600, 600a, 600b: three-dimensional object; 60a, 60b, 601, 602, 603, 60i: three-dimensional object image; 60ab: three-dimensional object overlapping part; 601p, 602p, 603p, 60ip: three-dimensional object correction image; 800: imaging space; 909: processing circuit; 910: processor; 920: storage device; 921: auxiliary storage device; 922: memory; 930: input interface; 940: output interface; Ea: first distortion degree; Eb: second distortion degree; R: overall area; R1, R2: area; Ra: first area; Rb: second area; Rab: common area; P: virtual viewpoint; xc: boundary position; xp, xpi, xp1, xp2, xp3: three-dimensional object position; Q, Qi, Q1, Q2, Q3: image deformation coefficient; S100: image processing; S110: boundary calculation processing; S120: bird's-eye view generation processing; S130: selection processing; S140: image generation processing; S150, S150a: area image generation processing; T1: intersection point

The invention claimed is:

1. An image processing device comprising:
processing circuitry to:
calculate, by using first device information including position information of a first imaging device to take an image of a first area including a common area wherein a three-dimensional object is placed, and second device information including position information of a second imaging device to take an image of a second area including the common area, a boundary position being a basis for dividing the common area into a side of the first imaging device and a side of the second imaging device;
select, based on the boundary position and a position of the three-dimensional object, a bird's-eye view image wherein distortion in an image of the three-dimensional object is less as a selected image, out of a first bird's-eye view image, which is an image of the first area being switched a viewpoint after having been taken by the first imaging device, wherein an image of the three-dimensional object is distorted, and of a second bird's-eye view image, which is an image of the second area being switched a viewpoint after having been taken by the second imaging device, wherein an image of the three-dimensional object is distorted; and
generate, based on an image of the first area other than the common area in the first bird's-eye view image, an image of the second area other than the common area in the second bird's-eye view image, and an image of the common area included in the selected image, an area image of an area composed of the first area and the second area.

2. The image processing device as defined in claim 1, wherein the processing circuitry selects as the selected image the first bird's-eye view image when the position of the three-dimensional object exists on the side of the first imaging device relative to the boundary position, and selects as the selected image the second bird's-eye view image when the three-dimensional object exists on the side of the second imaging device relative to the boundary position.

3. The image processing device as defined in claim 1, wherein the processing circuitry calculates the boundary position by using a first distortion degree representing a degree of distortion in the first bird's-eye view image, the first distortion degree being obtained by using the first device information and height information representing a height from a ground defined based on a kind of the three-dimensional object, and a second distortion degree representing a degree of distortion in the second bird's-eye view image, the second distortion degree being obtained by using the second device information and the height information.

4. The image processing device as defined in claim 3, wherein the processing circuitry calculates as the boundary position a position of the common area where an absolute value of a difference between the first distortion degree and the second distortion degree becomes a smallest value.

5. The image processing device as defined in claim 1, wherein the processing circuitry detects the position of the three-dimensional object based on a comparison image wherein a three-dimensional object does not exist in the common area, an image of the common area included in the first bird's-eye view image, and an image of the common area included in the second bird's-eye view image.

6. The image processing device as defined in claim 5, wherein the processing circuitry generates the area image by using a synthesis image obtained by correcting distortion in the image of the three-dimensional object in the image of the common area included in the selected image, and synthesizing the image of the three-dimensional object whose distortion is corrected and the comparison image, the image of the first area other than the common area in the first bird's-eye view image, and the image of the second area other than the common area in the second bird's-eye view image.

7. The image processing device as defined in claim 6, wherein the processing circuitry determines an image deformation coefficient based on the detected position of the three-dimensional object, and corrects distortion in the image of the three-dimensional object by using the image deformation coefficient.

8. An image processing method comprising:
calculating, by using first device information including position information of a first imaging device to take an image of a first area including a common area wherein a three-dimensional object is placed, and second device information including position information of a second imaging device to take an image of a second area including the common area, a boundary position being a basis for dividing the common area into a side of the first imaging device and a side of the second imaging device;
selecting, based on the boundary position and a position of the three-dimensional object, a bird's-eye view image wherein distortion in an image of the three-dimensional object is less as a selected image, out of a first bird's-eye view image, which is an image of the first area being switched a viewpoint after having been taken by the first imaging device, wherein an image of the three-dimensional object is distorted, and of a second bird's-eye view image, which is an image of the second area being switched a viewpoint after having been taken by the second imaging device, wherein an image of the three-dimensional object is distorted; and
generating, based on an image of the first area other than the common area in the first bird's-eye view image, an image of the second area other than the common area in the second bird's-eye view image, and an image of the common area included in the selected image, an area image of an area composed of the first area and the second area.

9. A non-transitory computer readable medium storing an image processing program to make a computer execute:
boundary calculation processing to calculate, by using first device information including position information of a first imaging device to take an image of a first area including a common area wherein a three-dimensional object is placed, and second device information including position information of a second imaging device to take an image of a second area including the common area, a boundary position being a basis for dividing the common area into a side of the first imaging device and a side of the second imaging device;

selection processing to select, based on the boundary position and a position of the three-dimensional object, a bird's-eye view image wherein distortion in an image of the three-dimensional object is less as a selected image, out of a first bird's-eye view image, which is an image of the first area being switched a viewpoint after having been taken by the first imaging device, wherein an image of the three-dimensional object is distorted, and of a second bird's-eye view image, which is an image of the second area being switched a viewpoint after having been taken by the second imaging device, wherein an image of the three-dimensional object is distorted; and image generation processing to generate, based on an image of the first area other than the common area in the first bird's-eye view image, an image of the second area other than the common area in the second bird's-eye view image, and an image of the common area included in the selected image, an area image of an area composed of the first area and the second area.

* * * * *